United States Patent
Nash et al.

(10) Patent No.: US 10,194,089 B2
(45) Date of Patent: Jan. 29, 2019

(54) SYSTEMS AND METHODS FOR IMPLEMENTING SEAMLESS ZOOM FUNCTION USING MULTIPLE CAMERAS

(71) Applicant: QUALCOMM Incorporated, San Diego, CA (US)

(72) Inventors: James Wilson Nash, San Diego, CA (US); Kalin Mitkov Atanassov, San Diego, CA (US); Sergiu Radu Goma, San Diego, CA (US); Narayana Karthik Sadanandam Ravirala, San Diego, CA (US); Venkata Ravi Kiran Dayana, San Diego, CA (US); Karthikeyan Shanmugavadivelu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 15/017,898

(22) Filed: Feb. 8, 2016

(65) Prior Publication Data
US 2017/0230585 A1    Aug. 10, 2017

(51) Int. Cl.
| | | |
|---|---|---|
| G06T 7/30 | (2017.01) |
| H04N 5/232 | (2006.01) |
| H04N 5/247 | (2006.01) |
| G06T 3/00 | (2006.01) |

(Continued)

(52) U.S. Cl.
CPC ....... *H04N 5/23296* (2013.01); *G06T 3/0068* (2013.01); *G06T 5/50* (2013.01);
(Continued)

(58) Field of Classification Search
CPC .......... H04N 5/23296; H04N 5/23241; H04N 17/002; H04N 13/0296; H04N 13/0239;
(Continued)

(56) References Cited

U.S. PATENT DOCUMENTS

| 5,005,083 A | 4/1991 | Grage et al. |
| 7,009,638 B2 | 3/2006 | Gruber et al. |

(Continued)

FOREIGN PATENT DOCUMENTS

| KR | 20070104716 A | 10/2007 |
| KR | 20100132739 A | 12/2010 |

(Continued)

OTHER PUBLICATIONS

International Search Report and Written Opinion—PCT/US2017/012927—ISA/EPO—dated Mar. 23, 2017.

(Continued)

*Primary Examiner* — Sathyanaraya V Perungavoor
*Assistant Examiner* — Howard D Brown, Jr.
(74) *Attorney, Agent, or Firm* — Paradice and Li LLP

(57) ABSTRACT

Devices and methods for providing seamless preview images for multi-camera devices having two or more asymmetric cameras. A multi-camera device may include two asymmetric cameras disposed to image a target scene. The multi-camera device further includes a processor coupled to a memory component and a display, the processor configured to retrieve an image generated by a first camera from the memory component, retrieve an image generated by a second camera from the memory component, receive input corresponding to a preview zoom level, retrieve spatial transform information and photometric transform information from memory, modify at least one image received from the first and second cameras by the spatial transform and the photometric transform, and provide on the display a preview image comprising at least a portion of the at least one modified image and a portion of either the first image or the second image based on the preview zoom level.

30 Claims, 11 Drawing Sheets

(51) Int. Cl.
    *G06T 5/50*       (2006.01)
    *H04N 5/225*    (2006.01)
    *H04N 5/268*    (2006.01)
    *H04N 9/04*      (2006.01)
    *H04N 13/02*    (2006.01)
    *H04N 17/00*    (2006.01)

(52) U.S. Cl.
    CPC ....... *H04N 5/2258* (2013.01); *H04N 5/23229* (2013.01); *H04N 5/23238* (2013.01); *H04N 5/23241* (2013.01); *H04N 5/23293* (2013.01); *H04N 5/247* (2013.01); *H04N 5/268* (2013.01); *H04N 9/045* (2013.01); *H04N 13/0239* (2013.01); *H04N 13/0296* (2013.01); *H04N 17/002* (2013.01); *G06T 2207/20221* (2013.01)

(58) Field of Classification Search
    CPC ...... H04N 9/045; H04N 5/268; H04N 5/2258; H04N 5/23229; H04N 5/23293; H04N 5/247; H04N 5/23238; G06T 5/50; G06T 3/0068; G06T 2207/20221
See application file for complete search history.

(56) References Cited

U.S. PATENT DOCUMENTS

| | | | |
|---|---|---|---|
| 7,305,180 | B2 | 12/2007 | Labaziewicz et al. |
| 8,098,287 | B2 | 1/2012 | Misawa et al. |
| 8,405,732 | B2 | 3/2013 | Ahiska et al. |
| 8,526,779 | B2 | 9/2013 | Simmons et al. |
| 9,185,291 | B1* | 11/2015 | Shabtay ............... H04N 5/2258 |
| 2005/0286753 | A1* | 12/2005 | Ho .......................... G06T 7/001 382/141 |
| 2008/0218611 | A1 | 9/2008 | Parulski et al. |
| 2008/0218613 | A1 | 9/2008 | Janson et al. |
| 2011/0064327 | A1* | 3/2011 | Dagher .................. G06T 5/004 382/263 |
| 2012/0026366 | A1 | 2/2012 | Golan et al. |
| 2013/0242059 | A1* | 9/2013 | Dahi ................. H04N 5/23254 348/47 |
| 2014/0184854 | A1 | 7/2014 | Musatenko |
| 2015/0085174 | A1* | 3/2015 | Shabtay ............. H04N 5/23296 348/336 |
| 2018/0096487 | A1* | 4/2018 | Nash ...................... H04N 5/217 |

FOREIGN PATENT DOCUMENTS

| | | |
|---|---|---|
| WO | WO-2008016474 A2 | 2/2008 |
| WO | WO-2009097552 A1 | 8/2009 |
| WO | WO-2013030699 A1 | 3/2013 |
| WO | WO-2014199338 A2 | 12/2014 |

OTHER PUBLICATIONS

Zitova B., et al., "Image registration methods: a survey," Image and Vision Computing, Oct. 2003, vol. 21, No. 11, pp. 977-1000.

\* cited by examiner

SYSTEMS AND METHODS FOR IMPLEMENTING SEAMLESS ZOOM FUNCTION USING MULTIPLE CAMERAS

BACKGROUND

Field

The systems and methods disclosed herein are directed to image processing, and, more particularly, to generating images using multi camera devices.

Description of the Related Art

Some imaging devices use two or more cameras to implement a zoom function. In these devices, each camera includes its own associated circuitry, lens and sensors. Accordingly, the output of these cameras, even when imaging the same scene, can differ in image parameters, for example in field of view and color. Depending on the zoom command received from a user's input, the imaging device can activate an appropriate camera and direct its output to an image preview screen. However, when the imaging device switches the active camera, a user can undesirably perceive a sudden change in the preview screen while composing an image scene in the preview mode of the imaging device. Consequently, systems and methods are needed to implement a seamless zoom where a user can compose an image scene and can input zoom commands without perceiving an undesirable shift in the preview mode of the imaging device when the imaging device switches between the active cameras.

SUMMARY

The systems, methods and devices of this disclosure each have several innovative aspects, no single one of which is solely responsible for the desirable attributes disclosed herein. Certain innovations relate to an imaging system that has two different cameras, for example, a camera configured for wide-angle image capture and a camera configured for telephoto image capture, and transitioning between a view displayed from one camera and then the other. The two cameras are positioned and configured to generally image the same target scene. A transition can be performed by "fading" (transitioning) a spatial alignment and a photometric alignment between the images produced by the two cameras using an intelligent state machine. The state machine is configured to display a view from one camera and transition to the view from the other camera as an imaging parameter changes, for example, a desired zoom level. The transition can include using a spatial transform (for example, that models spatial alignment differences between images from the two cameras) and/or a photometric transform (for example, that models color and/or intensity differences between images from the two cameras).

Using a spatial transform and a photometric transform, a "preview" image presented to a user can be indistinguishable regardless of which camera is being used to provide (or serve) the image(s). The transformation between the images from the two cameras are determined so they are known. Both cameras may be providing image information that is ultimately displayed as a preview image. In some embodiments, during a switch from one camera ("source camera") to the other camera ("destination camera"), the transforms may change the source camera image(s) to spatially and photometrically align with the destination camera image(s) so the source camera may be powered down to save power once the destination camera is providing the preview image. During the transformation from the source camera to the destination camera, if a switch is desired (back to the source camera) the system is configured to perform an inverse transformation that can account for the current extent of the transition (or fading) process.

One innovation includes a multi-camera device that includes a first camera having a field-of-view (FOV), the first camera configured to generate one or more first images, a second camera having a FOV that is smaller than the FOV of the first camera, the second camera configured to generate one or more second images, the first camera and the second camera positioned such that that a target scene in the FOV of the second camera is also in the FOV of the first camera, a display, a memory component, and a processor coupled to the memory component. The processor maybe configured to retrieve a first image from the memory component, retrieve a second image from the memory component, determine a spatial transform, the spatial transform including information to spatially align pixels of the first image and corresponding pixels of the second image, and save the spatial transform in the memory component, and determine a photometric transform, the photometric transform including information of differences in color and intensity between pixels of the first image and corresponding pixels of the second image, and save the photometric transform in the memory component. The processor may also be configured to receive input corresponding to a next preview zoom level, retrieve information of the spatial transform and the photometric transform from memory, modify at least one of the retrieved first and second images using the spatial transform information and the photometric transform information based on the next preview zoom level, and provide on the display a preview image, the display image comprising an image from the first camera, an image from the second camera, or an image that comprises a portion of the modified image and a portion of an image from the first camera or the second camera, based on the next preview zoom level.

The multi-camera device may include other aspects of the innovation. In one aspect, the first camera includes optics and a sensor array configured for the first camera to have an angle of view greater than or equal to 57 degrees, and the second camera includes optics and a sensor array configured for the second camera to have an angle of view less than 50 degrees. In another aspect wherein the memory component is configured to store predetermined alignment information relating to the relative alignment of the first and second camera, and the processor is further configured to retrieve the predetermined alignment information from the memory component, and use the predetermined alignment information to determine the spatial transform. In another aspect, the first camera includes a wide-angle lens and the second camera comprises a telephoto lens. In another aspect, the at least one modified image is an image from the first camera, and the preview image includes a portion of an image from the second camera. In another aspect, the received input indicates to display a preview image that is zoomed-in relative to an image currently being shown on the display. In another aspect, the at least one modified image is an image from the second camera and the preview image includes a portion of an image from the first camera. In another aspect, the received input indicates to display a preview image that is zoomed-out relative to an image currently being shown on the display.

In various embodiments, the processor may further be configured to control the first camera and the second camera to be in one of multiple activation states based on the preview zoom level, the activation states determining whether each of the first camera and the second camera are on or off, and determining if images from the first camera and the second camera are used in the preview image. In another aspect of the multi-camera device, the processor is further configured to compare the next preview zoom level to a zoom level first threshold value T1 and a zoom level second threshold value T2, the zoom level second threshold value T2 indicating a greater zoom-in level than the zoom level first threshold value T1, and place the first camera and the second camera in a first activation state with the first camera on and the second camera is off when the next preview zoom level is less than the first threshold T1, place the first camera off and the second camera on in a second activation state when the next preview zoom level is above the second threshold value T2, and place the first camera on and the second camera in a third activation state with the first camera and the second camera are on when the next preview zoom level is between the first threshold value T1 and a second threshold value T2. In one aspect, the preview image is based on at least one image from the first camera when the preview zoom level is less than the first threshold value T1, at least one image from the second camera when the preview zoom level is greater than the threshold value T2, and the portion of the modified image and a portion of an image from the first camera or the second camera when the preview zoom level is between the first threshold value T1 and the second threshold value T2. In one aspect, the processor is further configured to reduce power to the second camera when the next preview zoom level represents a zoom level below a first threshold value T1 and the preview image includes an image only from the first camera, and reduce power to the first camera when the next preview level represents a zoom level above a second threshold value T2 and the preview image includes an image only from the second camera.

Another innovation includes a method of displaying a preview image, the method including retrieving by a processor a first image from a memory component, the first image captured by a first camera having field-of-view (FOV), retrieving by the processor a second image from the memory component, the second image captured by a second camera having a FOV that is smaller than the FOV of the first camera, the first camera and the second camera positioned such that that a target scene in the FOV of the second camera is also in the FOV of the first camera, determining by the processor a spatial transform, the spatial transform including information to spatially align pixels of the first image and corresponding pixels of the second image, and saving the spatial transform in the memory component, determining by the processor a photometric transform, the photometric transform including information of differences in color and intensity between pixels of the first image and corresponding pixels of the second image, and saving the photometric transform in the memory component, receiving input corresponding to a next preview zoom level, retrieving the spatial transform information and the photometric transform information from memory, modifying at least one image received from a first and second cameras by the spatial transform information and the photometric transform information, and providing on the display a preview image comprising at least a portion of the at least one modified image and a portion of either the first image or the second image based on the next preview zoom level. The first camera may include optics and a sensor array configured for the first camera to have an angle of view greater than or equal to 57 degrees; and the second camera may include optics and a sensor array configured for the second camera to have an angle of view less than 50 degrees. In some aspects, the memory component is configured to store predetermined alignment information relating to the relative alignment of the first and second camera, and the processor is further configured to retrieve the predetermined alignment information from the memory component, and use the predetermined alignment information to determine the spatial transform.

In one aspect of the method, the first camera comprises a wide-angle lens and the second camera comprises a telephoto lens. In another aspect, the at least one modified image is an image from the first camera, and the preview image comprises a portion of an image from the second camera, and the received input indicates to display a preview image that is zoomed-in relative to an image currently being shown on the display. In another aspect, the at least one modified image is an image from the second camera and the preview image comprises a portion of an image from the first camera, and the received input indicates to display a preview image that is zoomed-out relative to an image currently being shown on the display. In another aspect, the method includes controlling by the processor the activation state of the first camera and the second camera based on the next preview zoom level, the activation state determining whether each of the first camera and the second camera are on or off, and determining if images from the first camera and the second camera are used in the preview image. In another aspect, the method includes comparing, by the processor, the next preview zoom level to a zoom level first threshold value T1 and a zoom level second threshold value T2, the zoom level second threshold value T2 indicating a greater zoom-in level than the zoom level first threshold value T1, placing the first camera and the second camera in a first activation state with the first camera on and the second camera is off when the next preview zoom level is less than the first threshold T1, placing the first camera off and the second camera on in a second activation state when the next preview zoom level is above the second threshold value T2, and placing the first camera on and the second camera in a third activation state with the first camera and the second camera are on when the next preview zoom level is between the first threshold value T1 and a second threshold value T2. In one aspect providing on display the preview image includes providing a preview image formed from at least one image from the first camera when the next preview zoom level is less than the first threshold value T1, at least one image from the second camera when the next preview zoom level is greater than the threshold value T2, and the portion of the modified image and a portion of an image from the first camera or the second camera when the next preview zoom level is between the first threshold value T1 and the second threshold value T2.

In another aspect, the innovative method further includes reducing, by the processor, power to the second camera when the next preview zoom level represents a zoom level below a first threshold value T1 and the preview image comprises an image only from the first camera, and reducing power to the first camera when the next preview zoom level represents a zoom level above a second threshold value T2 and the preview image comprises an image only from the second camera. In another aspect, the method further includes controlling the first camera and the second camera to be in one of multiple activation states based on the next preview zoom level, the activation states determining whether each of the first camera and the second camera are on or off, and determining if images from the first camera and the second camera are being output for use in a preview image. In another aspect, the method includes comparing the next preview zoom level indicated to range of zoom levels having a first threshold value T1 and a second threshold level T2 that indicates a greater zoom-in level than the first threshold level T1, controlling the first camera to be on and the second camera to be off in a first activation state where the next preview zoom level is less than the first threshold T1, controlling the first camera to be off and the second camera on in a second activation state when next preview zoom level is above the second threshold level T2, and controlling both the first camera and the second camera to be on in a third activation state when the next preview zoom level is between a first threshold level T1 and a second threshold level T2. The method may further include providing by the processor a preview image to the display based on at least one image from the first camera when the next preview zoom level is less than the first threshold value T1, providing by the processor a preview image based on at least one image from the second camera when the next preview zoom level is greater than the threshold value T2, and providing by the processor a preview image based on at least one image from the first camera and at least one image from the second camera when the next preview zoom level is between the first threshold value T1 and the second threshold value T2.

Another innovation includes a multi-camera device, including first means for generating one or more first images, said first means for generating having a field-of-view (FOV), second means for generating one or more second images, said second means for generating one or more first images having a FOV that is smaller than the FOV of said first means for generating one or more first images; said first means for generating one or more first images and said second means for generating one or more first images positioned such that that a target scene in the FOV of said second means for generating one or more first images also in the FOV of said first means for generating one or more first images; a means for displaying images; a means for storing electronic images and transform information; and means for processing coupled to said means for storing. In some embodiments, the means for processing is configured to retrieve a first image from said means for storing, retrieve a second image from said means for storing, determine a spatial transform, the spatial transform including information to spatially align pixels of the first image and corresponding pixels of the second image, and save the spatial transform in said means for storing, determine a photometric transform, the photometric transform including information of differences in color and intensity between pixels of the first image and corresponding pixels of the second image, and save the photometric transform in said means for storing, receive input corresponding to a next preview zoom level, retrieve information of the spatial transform and the photometric transform from said means for storing, modify at least one of the retrieved first and second images using the spatial transform information and the photometric transform information based on the next preview zoom level, and provide on said means for displaying a preview image, the display image including an image from said first means for generating one or more first images, an image from said second means for generating one or more second images, or an image that includes a portion of the modified image and a portion of an image from said first means for generating one or more images or said second means for generating one or more images, based on the next preview zoom level.

In some embodiments of the multi-camera device, said first means for generating one or more first images includes optics and a sensor array configured to have an angle of view greater than or equal to 57 degrees; and said second means for generating one or more second images includes optics and a sensor array configured to have an angle of view less than 50 degrees. In some embodiments, said means for storing includes one or more storage components, and wherein said means for processing includes one or more processors.

Another innovation includes a non-transitory computer-readable medium having code that, when executed, causes an electronic hardware processor to perform a method of providing a preview image that includes one or more images from a first camera and a second image, the method including retrieving a first image from a memory component, retrieving a second image from the memory component, determining a spatial transform that includes information to spatially align pixels of the first image and corresponding pixels of the second image, and saving the spatial transform in the memory component, determining a photometric transform that includes information of differences in color and intensity between pixels of the first image and corresponding pixels of the second image, and saving the photometric transform in the memory component, receiving input corresponding to a next preview zoom level, retrieving information of the spatial transform and the photometric transform from memory, modifying at least one of the retrieved first and second images using the spatial transform information and the photometric transform information based on the next preview zoom level, and providing on the display a preview image, the display image comprising an image from the first camera, an image from the second camera, or an image that comprises a portion of the modified image and a portion of an image from the first camera or the second camera, based on the next preview zoom level. In some embodiments, the method includes comparing the next preview zoom level to a zoom level first threshold value T1 and a zoom level second threshold value T2, the zoom level second threshold value T2 indicating a greater zoom-in level than the zoom level first threshold value T1, placing the first camera and the second camera in a first activation state with the first camera on and the second camera is off when the next preview zoom level is less than the first threshold T1, placing the first camera off and the second camera on in a second activation state when the next preview zoom level is above the second threshold value T2, placing the first camera on and the second camera in a third activation state with the first camera and the second camera are on when the next preview zoom level is between the first threshold value T1 and a second threshold value T2. In some embodiments, providing the preview image includes generating the preview image from at least one image from the first camera when the next preview zoom level is less than the first threshold value T1, from at least one image from the second camera when the next preview zoom level is greater than the threshold value T2, and from the portion of the modified image and a portion of an image from the first camera or the second camera when the next preview zoom level is between the first threshold value T1 and the second threshold value T2.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
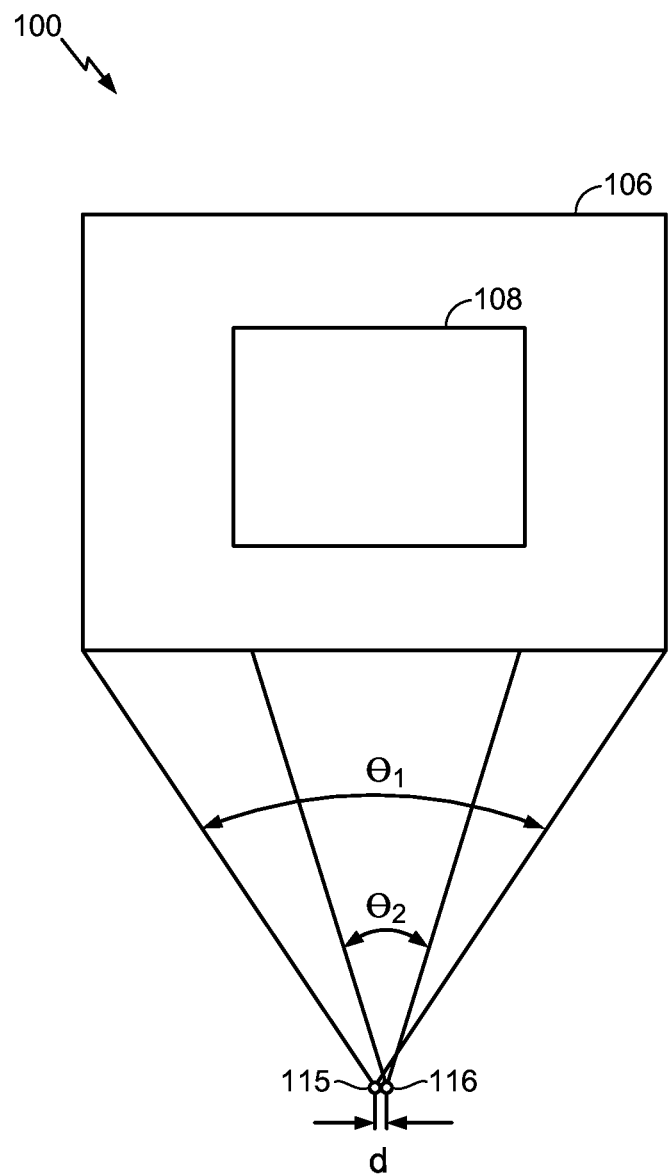
FIG. 1 illustrates an example of a diagram of different fields of view corresponding to different cameras or lenses of a multi-camera device.

Embodiments of the disclosure relate to systems and techniques for implementing a seamless zoom function in a multi-camera device, for example, a device having two cameras. "Camera" as used herein refers to a set of image sensing components that typically include a sensor array (or "sensor") and one or more optical components (for example, one or more lenses or light re-directing components, sometimes referred to herein as "optics" or "set of optics") which light from a target scene propagates through before it reaches the sensor array. In some embodiments, a multi-camera device may include multiple cameras, each including a set of optics and a corresponding sensor array. In other examples of devices with multiple cameras, a particular set of optics may correspond to two or more sensors, that is, provide light to two or more sensors. Some of the examples described herein describe a multi-camera device with asymmetric lenses/cameras, for example, a wide-angle camera and a telephoto camera, however, other examples of multi-camera devices are also contemplated, and this disclosure is not intended to be limited to the particular examples described.

When viewing images generated by an imaging device having two or more cameras, switching between the cameras can cause undesirable image aberrations which may be perceived by a user viewing the images on a display. For example, the images generated by the two cameras for the same target scene may be different in spatial orientation and appear to have colors. Methods and systems of this disclosure address switching between cameras, for example, a two camera system where a first camera is configured to capture wide angle images of a target scene and includes a wide angle lens, and a second camera configured to capture telephoto images of the same target scene and includes a telephoto lens. A desired characteristic of a multiple camera system is to switch from a wide-angle camera view to a telephoto camera view of a target scene when a zoom-in command is received and the switching is seamless, that is, it is not able to be perceived by a user, or such perception of the switch between cameras is minimized.

With multiple cameras on an imaging apparatus, the images captured may be at different viewpoints due to the physical location of the cameras being different. For example, the cameras may be separated by a distance of one (1) cm on the multi-camera device. To align the images such that when they are viewed the differences that exist in the raw images are imperceptible, the images may be spatially aligned, the color (and intensities) of the images may be aligned, and then the images may be presented for viewing in a fusion process that further minimizes the perceptible difference between images generated by two (or more) different cameras. In some examples, based on the distance to the object being viewed, either images from wide-angle camera are presented on a display, images from a telephoto camera are presented on the display, or a fused image is presented on the display, where one portion of the fused image is based on data from the wide-angle camera and another portion of the fused image is based on data received by the telephoto camera. Such a fused image is based on transforming images from a first camera (e.g., a wide-angle camera) to match images from a second camera (e.g., a telephoto camera), or transforming images from a second camera (e.g., a telephoto camera), to match images from a first camera (e.g., a wide-angle camera), or transforming images from one, or both, a first and second camera to generate fused images, according to various embodiments.

The systems and methods may include operations on "still" preview images or video preview images. In some embodiments, for still images, a preview image may include an image formed from two cameras. For example, the preview image may have an outer portion that is from a wide-angle camera and a center portion that is from a telephoto camera, the portions being stitched together to appear seamless (or nearly so) to a viewer. That is, the portion of a wide-angle image of a target scene that is captured by a telephoto camera is replaced by the corresponding portion of a telephoto image of the target scene. In such an example, spatial alignment and photometric alignment operations transform pixels of one or both images to provide the seamless composite image. To provide a seamless composite image, the portion of the borders of the two images may registered. The photometric transform of pixels in the border region allow the borders to be seamless when the image is presented in a preview image.

In some embodiments, static calibration in the factory may be performed first, which includes identifying corresponding regions in both set of images and estimating a mathematical function (transform) that maps the pixels from an image captured by one camera to pixels in the an image captured by another camera. The calibration may include detecting keypoints in the two images being matched, matching the keypoints between the images, and estimating parameters of that matching to generate a spatial transform that defines a spatial relationship between corresponding pixels in images from the first camera and images from the second camera. The parameters for the spatial transform may include, for example, a scale shift, an angular rotation, or a shift in the horizontal or vertical direction.

After the images from the first and second cameras are spatially aligned, photometric alignment may be performed to match corresponding portions of the images in color and intensity. In some embodiments, the images from the first camera (e.g., a wide-angle camera) and from the second camera (e.g., a telephoto camera) are partitioned into regions, and histogram equalization is performed in multiple regions in the images. For example, the images from the first and second cameras can be divided into N regions and local histograms are computed for each of the regions. The histograms of corresponding regions may be equalized for intensity of color channels that make up the image. Adjacent regions are interpolated so boundaries of the regions are made seamless. In some examples, photometric alignment generates photometric transformation parameters that can be stored and then retrieved and applied to subsequent images of the first and/or second camera to photometrically align the images. The transformation parameters can be adaptive. In other words, the transformation parameters may be dynamically updated and re-stored for later use as additional images from the from the first camera and the second camera are spatially and photometrically determined.

FIG. 1 illustrates an example of different fields of view corresponding to different cameras of a multi-camera device 100. In this example, the multi-camera device 100 includes a first camera 115 having optics that includes a wide-angle lens, and a second camera 116 having optics that includes a telephoto lens. The first camera 115 and the second camera 116 are positioned to both have a field-of-view (FOV) that includes the same target scene but each with a different angle of view of the target scene. In this example implementation, the first camera 115 (also referred to as wide-angle camera 115) has an angle of view $\theta_1$, and the second camera 116 (also referred to as telephoto camera 116) has an angle of view $\theta_2$. The angle of view $\theta_1$ for the wide-angle camera 115 is larger than the angle of view $\theta_2$ for the telephoto camera 116. Thus, the wide-angle camera 115 produces images with a "wider" field of view 106 compared to the telephoto camera 104 which produces images having a "narrower" field of view 108. As illustrated in FIG. 1, the wide-angle camera 115 of the multi-camera device 100 can be positioned a known distance "b" from the telephoto camera 116, as will be discussed further below.

In an example implementation, the first camera 115 is the main camera and has a wide angle lens, for example, having a focal length of 3.59 mm. The angle of the FOV of the first camera 115 is 67 degrees. The sensor of the first camera 116 includes an array of 4208 pixels along a length dimension, having 1.12 μm pixels, have a 4:3 aspect, and have autofocus functionality. In an example implementation, the second camera is an auxiliary camera and has telephoto lens having a focal length of 6 mm. In this example implementation, the angle of view of the second camera 116 is 34 degrees, and the sensor of the second camera 116 includes an array of 3208 pixels along a length dimension, having 1.12 μm pixels, has a 4:3 aspect, and also has auto-focus functionality.

Images captured by each camera of the multi-camera device 100 can be provided to a display device for viewing by a user. When the multi-camera device 100 is aimed at a target scene and receives a zoom-in command, the multi-camera device 100 may switch from the wide-angle camera 115 to the telephoto camera 116 while a user is previewing the target scene on a display and/or when images are being captured by the multi-camera device 100. Because a telephoto lens has a narrower field of view than a wide-angle lens and may have a different sensor and different imaging parameters, the user may perceive, and in video the multi-camera device may capture, a sudden undesirable change in preview images shown on the display. Similarly, a zoom-out command may cause the multi-camera device to switch from the telephoto camera 116 to the wide-angle camera 116, and because a telephoto lens has a narrower field of view than a wide-angle lens, a perceptible sudden, undesirable change in the images maybe seen on the display device and captured in images captured by the multi-camera device 100.

FIGS. 2A-2F illustrate an example of a multi-camera device 204 imaging a scene 202, where a display 203 shows a preview of the scene 202 in response to zoom commands 212, according to some embodiments. In this example, the multi-camera device 204 includes a first camera with a wide-angle lens (wide-angle camera) 206 and a second camera with a telephoto lens (telephoto camera) 208. The illustrated multi-camera device 204 also includes a display 203. The display 203 can be used to view images before they are captured and stored in memory (i.e., preview images), or images that are being captured and stored in memory. In FIGS. 2A-2F, region 205 denotes the field of view of the telephoto camera 208 while the region 210 can denote the field of view of the wide-angle camera 206. As the multi-camera device 204 processes a zoom-in command, the display 203 correspondingly shows a zoomed-in representation of the scene 202 as illustrated by FIGS. 2B-2F. Zoom sliders 212 illustrates the level or range of zoom command input by a user.

Figure 2:
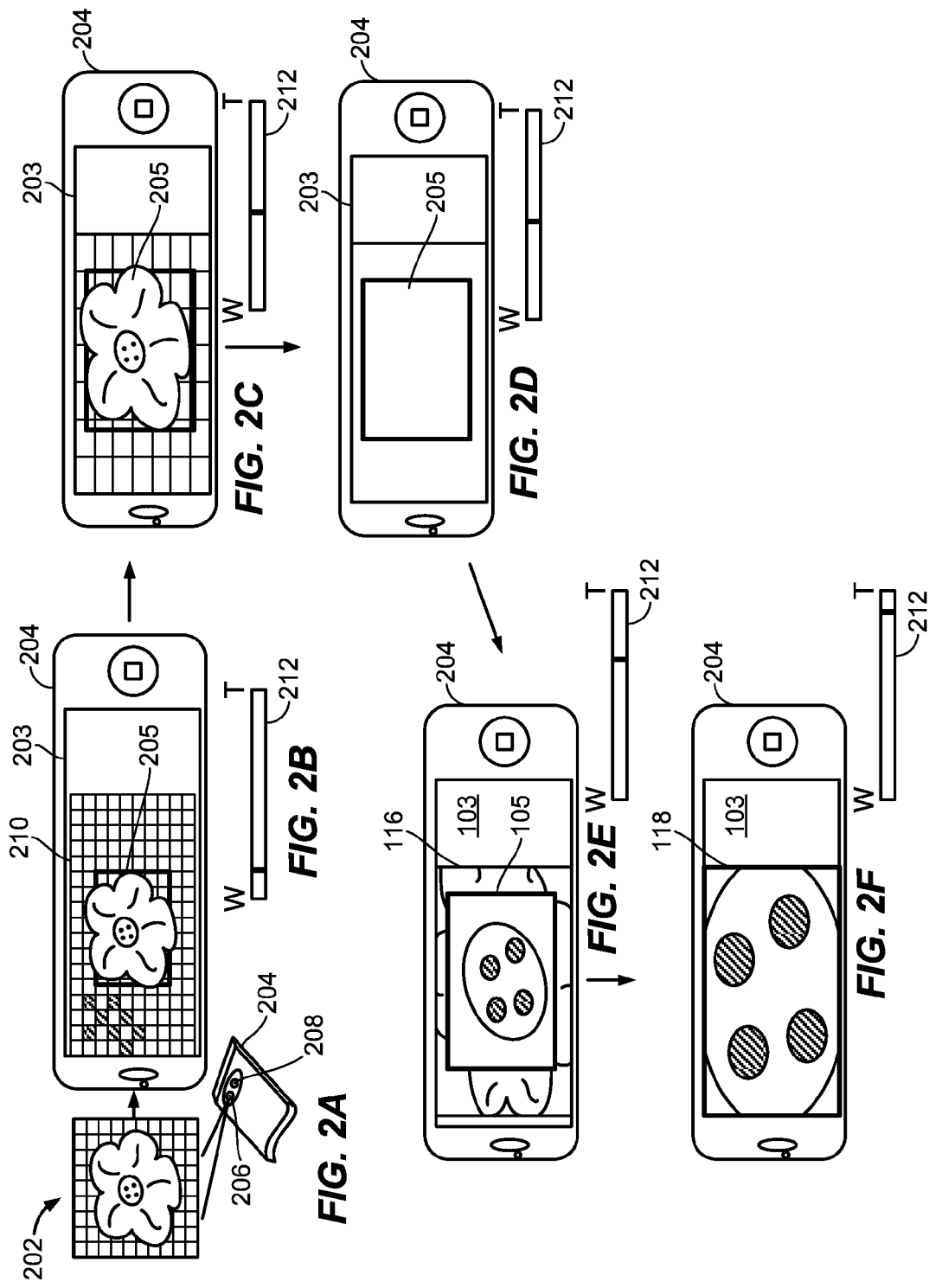
FIGS. 2A-2F illustrate an example of a two-camera device imaging a scene where a display shows a preview of the scene in response to zoom commands from a user, according to some embodiments.

FIG. 2B illustrates when the zoom-in command is indicative of a zoom level where the output of an image captured using wide-angle camera 206 can be provided to the display 203 and fills the display. In FIG. 2B, the field of view of the telephoto camera 204 is denoted by region 205. The actual boundaries of the region 205 may be imperceptible (as displayed) to the user. In FIG. 2C, a received zoom-in command indicating a zoom level where the multi-camera device 204 activates the telephoto camera 208 and uses images captured using the telephoto camera 208 to display a more zoomed-in image. The wide angle camera 206 and the telephoto camera 208 may produce images that differ in color and spatial alignments in the region 205. In FIG. 2D, when the imaging limits of the wide-angle camera 206 are reached (or are at some threshold value near that point) the multi-camera device 204 may produce a fused (or combined) image, combining the output of the wide-angle camera 206 and the telephoto camera 208. That is, producing a fused image where the center portion of the fused image corresponds to the region 205 containing image data from the telephoto camera 208 and the remaining portions between the regions 205 and 210 contain image data from the wide-angle camera 206. To the user the preview images shown on the display 203 in FIGS. 2C and 2B may appear similar or identical. Registration may be performed in border areas in the fused image, where portions of each of the two images are adjacent to each other, to ensure a seamless (or nearly so) fused image. In FIGS. 2E and 2F, if the multi-camera device 204 continues receive a zoom-in command, the multi-camera device 204 can continue to zoom-in the region 205 and the image data for previewing images of the target scene can be already available as a result of the image fusion operation performed earlier.

Conversely, in FIG. 2F, the multi-camera device 204 may begin receive a zoom-out command, and in zooming out the limits of the image data illustrated in FIG. 2E from the telephoto camera 208 may be reached. Between FIGS. 2E and 2D, the multi-camera device 204 can perform another image fusion operation, producing an image combining the output of the wide-angle camera 206 and the telephoto camera 208 to produce an image where the center portion corresponding to the region 205 contains image data from the telephoto camera 208 and the remaining portions between the regions 205 and 210 contain image data from the wide-angle camera 206.

If the spatial transform and photometric transform described herein are not performed, a user may see an abrupt change in the display 203 going from FIG. 2C to FIG. 2E when a zoom-in command is received at or near the outer limit of the wide-angle camera 206 and the image displayed changes from the wide-angle camera 206 to the telephoto camera 208. Additionally, the user may see an abrupt change in the display 203 going from FIG. 2E to FIG. 2C when a zoom-out command is received and the image displayed is at or near the limit of the telephoto camera 208. To address these issues, a transitional image may be produced combining spatially aligned and photometrically aligned images of both the wide-angle camera 206 and the telephoto camera 208 such that switching between the two cameras can be performed in a seamless manner unperceivable or nearly unperceivable to the user.

As discussed above, the images produced by the wide-angle camera 206 and telephoto camera 208 can be different in spatial alignment and/or photometric characteristics (e.g., color, intensity). In some embodiments, spatial alignment and/or color intensity matching or equalization can be performed to produce a smooth transform of images from the wide-angle camera 206 and telephoto camera 208. Image alignment functionality may include image spatial alignment along with intensity equalization in region matching for image alignment. Each image in a set of images can depict substantially the same image scene, for example from different viewpoints, in different lighting, or in different portions of the electromagnetic spectrum. Each of the images in the set can be divided into a number of regions including blocks of pixels. The regions can be matched to determine regions depicting corresponding features between the images, that is, to determine which regions in the images depict the same feature. The regions depicting corresponding features can be matched spatially and as to intensity. The spatial or intensity correspondence between regions depicting corresponding features can permit accurate matching using the regions, leading, for example, to accurate downstream image alignment and/or depth map construction.

In some embodiments, the regions can be determined at least partly based on identifying distinctive features, referred to as keypoints, in each image in the set of images. Keypoints may be selected and/or processed such that they are invariant to image scale changes and/or rotation and provide robust matching across a substantial range of distortions, changes in point of view, and/or noise. The region location, shape, and size can be determined based, for example, on the location, shape, and size of the extracted features. Spatial and/or intensity equalization between corresponding regions can adapt to local structure content such as the shape of keypoints. Accordingly, the effects of spatial and/or intensity variations on keypoint matching can be mitigated or eliminated by region matching and/or equalizing intensity of corresponding regions after keypoint detection.

Spatial alignment or equalization of intensity values between corresponding regions can accommodate the structure of keypoints included in the regions. In some examples, the histogram of each corresponding region can be analyzed to determine spatial intensity variation, and a spatial mapping between the intensities of the corresponding regions can be performed to provide equalized intensity that is adapted to local structure content such as distinctive features. For example, after determining an equalization function based on histogram analysis of the blocks in a pair of images, intensity values in a first image can be mapped to the intensity values in a second image one such that the first image is transformed to have a histogram most closely resembling or matched to a histogram of the second image. All of the determined regions may look very similar in terms of intensity values, and accordingly can be identified by subsequent processing as corresponding regions in each image even though they were produced with different sensors, optics, and/or light wavelengths.

Although aspects of the embodiments described in this disclosure will focus on region matching within the context of stereo image pairs, this is for purposes of illustration and is not intended to limit the use of the spatial alignment and local intensity equalization techniques described herein. Spatial and/or intensity alignment using region matching for non-stereo image pairs can be also performed more accurately using the spatial alignment and/or local intensity equalization techniques described herein. For example, spatial alignment and/or local intensity equalization according to the embodiments described herein can provide for more accurate multispectral image alignment—matching images from different portions of the spectrum of light—such as aligning a near-infrared (NIR) image and a visible color (e.g., RGB) image captured of the same image scene. Spatial alignment and/or local intensity equalization can also provide more accurate spectroscopic image alignment, for example for aligning sets of images taken at different wavelengths by optical systems using diffraction grating to perform spectroscopy. The spatial alignment and/or local intensity equalization techniques described herein can be used to align a pair of images or a set of three or more images in various embodiments. Further, the spatial alignment and/or local intensity equalization techniques described herein are not limited to alignment by region matching, and can be incorporated into any image alignment or rectification technique.

Figure 3:
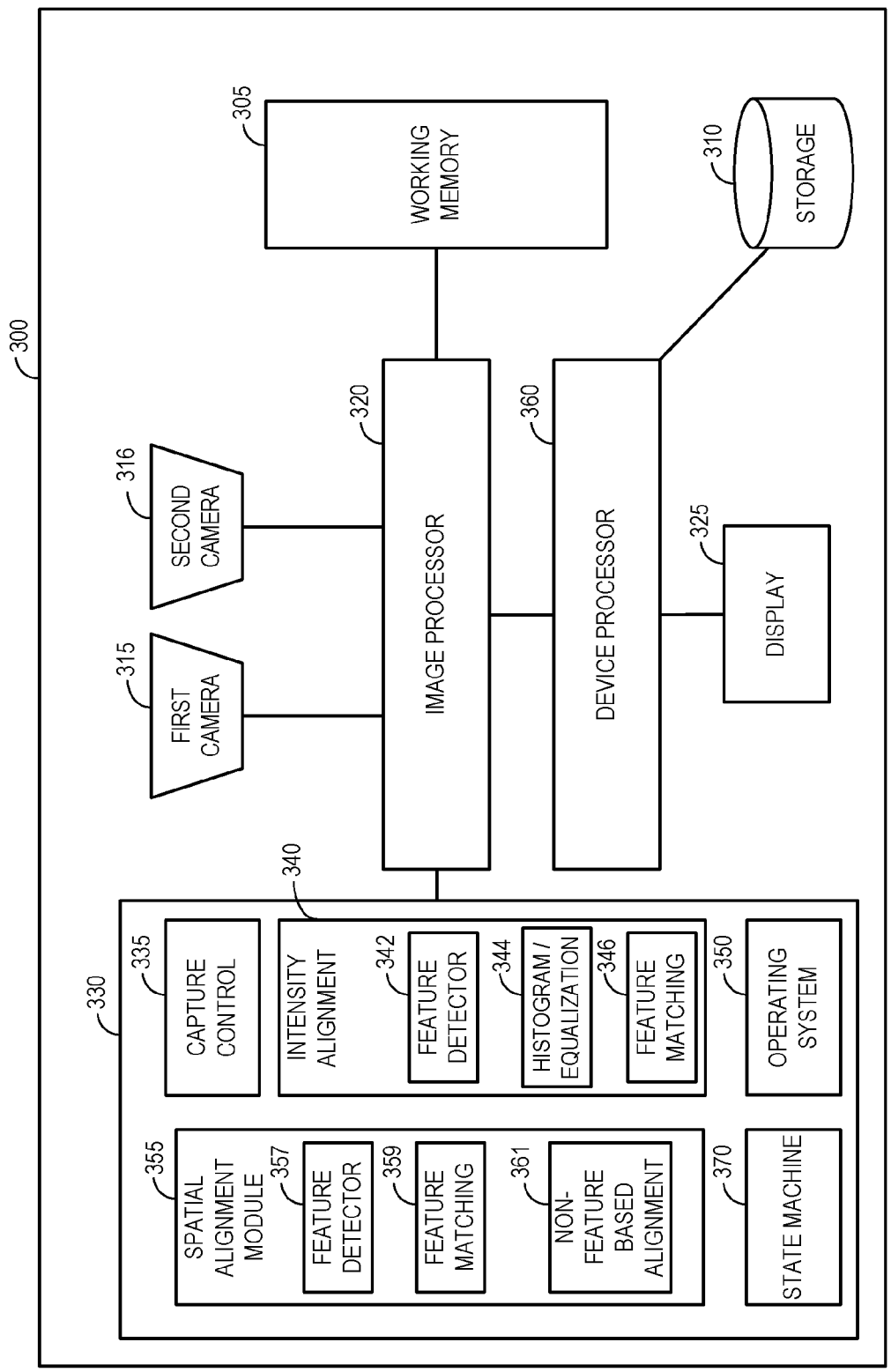
FIG. 3 is a block diagram illustrating an example of an embodiment of a multi-camera device having seamless zoom capability.

FIG. 3 is a block diagram illustrating an example of an embodiment of a multi-camera device 300 having seamless zoom capability. In this example, the multi-camera device 300 includes an image processor 320 coupled to two of more cameras, in this example, a first camera 315 and a second camera 316. The multi-camera device 300 also may include a working memory 305, storage 310, a display 325, and a memory 330, all coupled to and in communication with the image processor 320. In some embodiments including the illustrated embodiment in FIG. 3, components of the multi-camera device 300 including the display 325 and storage 310 may be coupled to and/or in communication with the image processor 320 via a device processor 360. In this example, memory 300 includes modules having instructions to configure the image processor to perform various operations including seamless zoom functionality.

In various embodiments, the multi-camera device 300 may be a cell phone, digital camera, tablet computer, personal digital assistant, or the like. A plurality of imaging applications may be available to the user on multi-camera device 300. These applications may include traditional photographic and video applications, high dynamic range imaging, panoramic photo and video, stereoscopic imaging such as 3D images or 3D video, or multispectral imaging, to name a few. The multi-camera device 300 as illustrated includes the first camera 315 and second camera 316 for capturing external images. The first camera 315 and second camera 316 each may include various components that are not explicitly shown in FIG. 3 for clarity, including for example a sensor, a lens assembly, and autofocus module. The first camera 315 and second camera 316 may be charge coupled devices (CCD) or complementary metal oxide semiconductors (CMOS) in some embodiments. The first camera 315 and second camera 316 are configured with different components (for example, optics, sensors) and thus produce images that are formed based on their own particular optics and sensor. Thus, the target image scene may be captured as a set of images in which first camera 315 captures an image A according to the sensor's intensity response and first camera second camera 316 captures an image B according to the sensor's intensity response. Additionally, the captured images A and B can differ in spatial alignment, for example, due to the physical offset between the cameras, roll, pitch and yaw between the cameras or lenses in sensor assemblies A and B. Although two cameras are shown (i.e., first camera 315 and second camera 316), this is for purposes of illustration and is not intended to limit the type of system which can implement the spatial alignment and intensity equalization techniques described herein. In other embodiments, three or more cameras can capture a set of images of a target scene, the set of images exhibiting at least some spatial misalignment and/or local intensity variation. In still other embodiments, a single cameras can capture a set of images of a target scene, the set of images exhibiting at least some local intensity variation. In some embodiments, one or more of the cameras may not be part of the multi-camera device 300, instead information from one or more cameras is provided to the multi-camera device 300 for processing. For example, the cameras may be part of another imaging system, and information from such a system may be provided to be processed using functionality described for the multi-camera device 300. In some embodiments, such information is first stored, and then provided to the multi-camera device 300 for processing. The number of sensor assemblies may be increased or decreased according to the needs of the imaging system 300. The first camera 315 and second camera 316 may be coupled to the image processor 320 to transmit captured images to the image processor 320.

The image processor 320 may be configured to perform various processing operations on received image data including a number of images of the image scene in order to output an accurately aligned image set, as will be described in more detail below. Image processor 320 may be a general purpose processing unit or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Image processor 320 may, in some embodiments, comprise a plurality of processors. Certain embodiments may have a processor dedicated to each image sensor. Image processor 320 may be one or more dedicated image signal processors (ISPs) or a software implementation of a processor.

Image processor 320 is connected to a memory 330 and a working memory 305. In the illustrated example, the memory 330 stores capture control module 335, intensity alignment module 340, spatial alignment module 255, state machine module 370 and operating system 350. These modules include instructions that configure the image processor 320 and/or device processor 360 to perform various image processing and device management tasks. Working memory 305 may be used by image processor 320 to store a working set of processor instructions contained in the modules of memory 330. Alternatively, working memory 305 may also be used by image processor 320 to store dynamic data created during the operation of multi-camera device 300.

As described above, the image processor 320 may be configured, or controlled, by several modules stored in the memory, for example, memory 330. The capture control module 335 may include instructions that configure the image processor 320 to adjust the focus position of first camera 315 and second camera 316. Capture control module 335 may further include instructions that control the overall image capture functions of the multi-camera device 300. For example, capture control module 335 may include instructions that call subroutines to configure the image processor 320 to capture raw image data of a target image scene using the first camera 315 and second camera 316. Capture control module 335 may then call the spatial alignment module 355 and/or intensity alignment module 340 to perform spatial alignment and/or local intensity equalization on the images captured by the first camera 315 and second camera 316, and to output aligned image data to image processor 320. Capture control module 335 may also call the spatial alignment module 355 and/or intensity alignment module 340 to perform spatial alignment and/or intensity equalization on raw image data in order to output a preview image on display 325 of a scene to be captured in some embodiments, and to update the preview image at certain time intervals or when the scene in the raw image data changes.

Spatial alignment module 355 may include instructions that configure the image processor 320 to perform spatial alignment on captured image data. For example, each of the first camera 315 and second camera 316 may capture an image depicting the target scene according to each camera's different parameters and characteristics. As discussed above, images generated of the same target scene from the first camera 315 and second camera 316 may differ due to discrepancies in sensor gains, roll-offs, pitch, yaw, sensitivity, field of view, white balance, geometric distortion, and noise sensitivities, differences between the lenses in the first camera 115 and the second camera 116, and on-board image signal conditioning. In order to perform accurate spatial alignment of the images, spatial alignment module 355 may configure the image processor 320 to detect corresponding features between the images from the first camera 315, estimate an appropriate transformation (or mapping between the corresponding regions) and perform region matching producing images which can be accurately juxtaposed on top of each other. Additionally, the spatial alignment module 355 may configure the image processor 320 to align the two images even when corresponding features between images cannot be detected.

Spatial alignment module 355 can include feature detector 357 including instructions that configure the image processor 320 to detect distinctive features, or keypoints, in the image data. Such features can correspond to points in the images that can be matched with a high degree of accuracy. For example, distinctive features may be characterized at least partly by the presence or sharpness of edges or lines, corners, ridges, or blobs differing in properties, for example, size, shape, dimension, brightness or color compared to surrounding pixel regions. Generally, object or feature recognition may involve identifying points of interest (also called keypoints) in an image and/or localized features around those keypoints for the purpose of feature identification. An object or feature may be characterized by descriptors identifying one or more keypoints. Keypoints can be identified by any known feature detection technique, e.g., sum of squared differences, Laplacian of Gaussian (LoG), difference of Gaussian (DoG), and determinant of the Hessian (DoH), to name a few.

Feature detector 357 can also include instructions that configure the image processor 320 to partition the image data into regions including pixel blocks based at least partly on the identified keypoints. The pixel block location, shape, and size can be determined based, for example, on the location, shape, and size of the identified keypoints. In some embodiments such as some stereoscopic alignment applications, the feature detector 357 can include instructions that configure the image processor 320 to limit pixel block size to larger than a disparity value and/or smaller than a roll-off variation value.

Spatial alignment module 355 can also include a matching module 359, which includes instructions that configure the processor 320 to estimate and apply one or more transformations to match the corresponding regions of one or more images generated by the first camera 315 and the second camera 316.

Intensity alignment module 340 may include instructions that configure the image processor 320 to perform image intensity alignment (which also may be referred to photometric alignment) using local intensity equalization techniques on captured image data. For example, each of the first camera 315 and second camera 316 may capture an image depicting the target scene according to each sensor's intensity response. As discussed above, the intensity responses may differ due to discrepancies in sensor gains, roll-offs, sensitivity, field of view, white balance, geometric distortion, and noise sensitivities, among other things, due to differences in the lenses and/or sensors first camera 315 and second camera 316, and on-board image signal conditioning. In order to perform accurate intensity alignment of the images despite local intensity variations between the images, intensity alignment module 340 may configure the image processor 320 to partition the images into a number of regions, equalize local intensity values of corresponding regions, and perform region matching using the intensity-equalized regions.

For instance, intensity alignment module 340 can include feature detector 342 including instructions that configure the image processor 320 to detect distinctive features, or keypoints, in the image data. Such features can correspond to points in the images that can be matched with a high degree of accuracy. For example, distinctive features may be characterized at least partly by the presence or sharpness of edges or lines, corners, ridges, or blobs differing in properties, for example, size, shape, dimension, brightness or color compared to surrounding pixel regions. Generally, object or feature recognition may involve identifying points of interest (also called keypoints) in an image and/or localized features around those keypoints for the purpose of feature identification. An object or feature may be characterized by descriptors identifying one or more keypoints. Keypoints can be identified by any known feature detection technique, e.g., sum of squared differences, Laplacian of Gaussian (LoG), difference of Gaussian (DoG), and determinant of the Hessian (DoH), to name a few.

Feature detector 342 can also include instructions that configure the image processor 320 to partition the image data into regions including pixel blocks based at least partly on the identified keypoints. The pixel block location, shape, and size can be determined based, for example, on the location, shape, and size of the identified keypoints. In some embodiments such as some stereoscopic alignment applications, the feature detector 342 can include instructions that configure the image processor 320 to limit pixel block size to larger than a disparity value and/or smaller than a roll-off variation value.

Intensity alignment module 340 can also include histogram module 344, which includes instructions that configure the processor 320 to generate and analyze histograms of the regions and generate an intensity equalization function based at least partly on the histogram analysis. Histogram module 344 can include instructions that configure the processor 320 to determine the probability mass function (PMF) of each block, to sum the mass in the PMF to compute the cumulative mass function (CMF), and to use the CMF to map intensity values from pixels in the image captured by first camera 315 to pixels in the image captured by second camera 316 (or vice versa). Accordingly, the intensity equalization between corresponding regions can adapt to local structure content such as the shape of keypoints.

Intensity alignment module 340 can also include matching module 346, which includes instructions that configure the processor 320 to perform region matching using the intensity-equalized image data generated by the histogram module 344. Due to the local adaptive intensity equalization, the corresponding keypoint regions may look very similar to one another in terms of intensity values, enabling highly accurate matching around the keypoint structures, even in images exhibiting spatially varying intensity.

State machine module 370 configures the image processor 320 and/or the device processor 360 to turn the first camera 315 and the second camera 316 on and off, to take image feeds from the first and second cameras 115, 116, to show on a display portions or all of the images from the first and second cameras 115, 116. The resulting state as dictated by the state machine 370 may cause image transformation parameters to be stored, or retrieved from storage, that may be used to reapply the transformation parameters or the inverse of the transformation depending on the zoom command input by a user of the multi-camera device 300.

Operating system module 350 may configure the image processor 320 to manage the working memory 305 and the processing resources of multi-camera device 300 for various operational tasks. For example, operating system module 345 may include device drivers to manage hardware resources such as the first camera 315 and second camera 316. Therefore, in some embodiments, instructions contained in the image processing modules discussed above may not interact with these hardware resources directly, but instead interact through standard subroutines or APIs located in operating system module 350. Instructions within operating system module 350 may then interact directly with these hardware components. Operating system module 350 may further configure the image processor 320 to share information with device processor 360.

Device processor 360 may be configured to control the display 325 to display the captured image, or a preview of the captured image, to a user. The display 325 may be external to the multi-camera device 300 or may be part of the multi-camera device 300. The display 325 may also be configured to provide a view finder displaying a preview image for a use prior to capturing an image, or may be configured to display a captured image stored in memory or recently captured by the user. The display 325 may comprise an LCD or LED screen, and may implement touch sensitive technologies.

Device processor 360 may write data to storage module 310, for example data representing captured images, image alignment data, intensity value data, and the like. While storage module 310 is represented graphically as a traditional disk device, those with skill in the art would understand that the storage module 310 may be configured as any storage media device. For example, the storage module 310 may include a disk drive, such as a floppy disk drive, hard disk drive, optical disk drive or magneto-optical disk drive, or a solid state memory such as a FLASH memory, RAM, ROM, and/or EEPROM. The storage module 310 can also include multiple memory units, and any one of the memory units may be configured to be within the multi-camera device 300, or may be external to the multi-camera device 300. For example, the storage module 310 may include a ROM memory containing system program instructions stored within the multi-camera device 300. The storage module 310 may also include memory cards or high speed memories configured to store captured images which may be removable from the camera.

Although FIG. 3 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance. Additionally, although FIG. 3 illustrates two memory components, including memory component 330 including several modules and a separate working memory 305, other embodiments may utilize different memory architectures. For example, a design may utilize ROM or static RAM memory for the storage of processor instructions implementing the modules contained in memory 330. The processor instructions may be loaded into RAM to facilitate execution by the image processor 320. For example, working memory 305 may comprise RAM memory, with instructions loaded into working memory 305 before execution by the processor 320.

Figure 4:
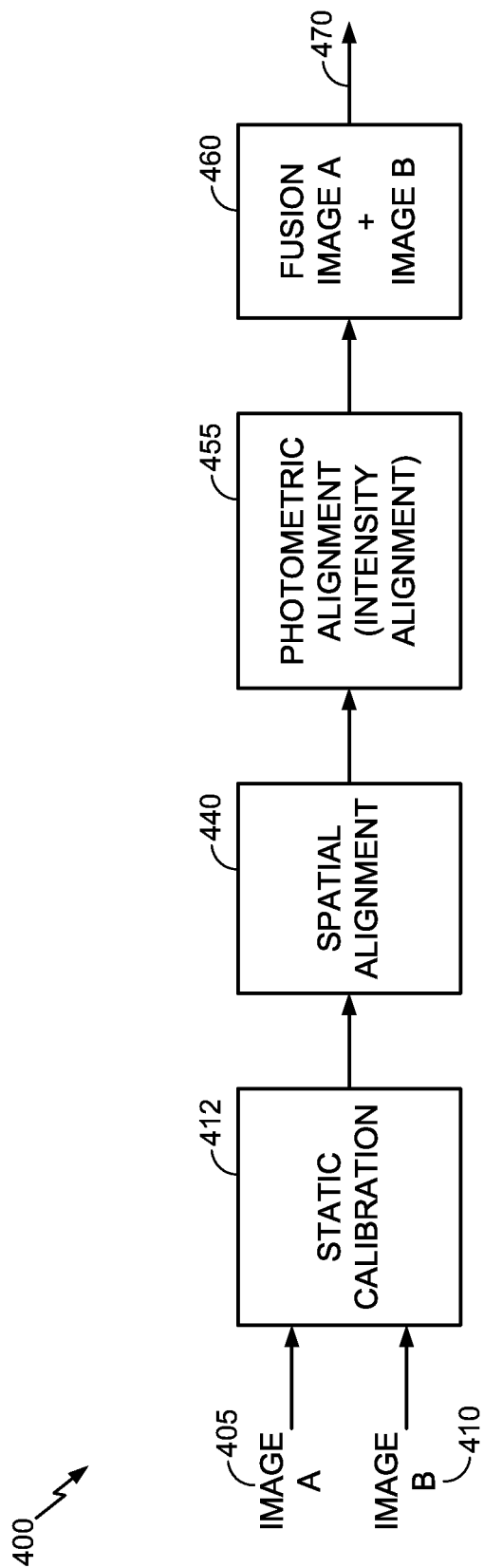
FIG. 4 is a block diagram illustrating a process to seamlessly display in to a user images A from a first camera and images B second camera, the first and second cameras being part of a multi-camera device, when the multi-camera device is zoomed in or out.

FIG. 4 is a block diagram illustrating an example of the overview of a process and/or system 400 to seamlessly display an image, or a series of images, of a target scene that represent the field-of-view of a multi-camera device as it is being zoomed-in or zoomed-out, the displayed image including data from one or more of the cameras of the multi-camera device. In such a process/system, the images from the multiple cameras are processed such that when they are displayed, there is not a perceivable difference to user when the image displayed is being provided from one camera or the other, or both, despite each camera having different imaging characteristics. In the example of FIG. 4, the multi-camera device has two cameras. In other examples, the multi-camera device can have three or more cameras. Each of the illustrated blocks of process/system 400 is further described herein.

Image A 405 from a first camera and image B 410 from a second camera are received and static calibration 412 is performed. Although referred to for convenience as image A 405 and image B 410, image A 405 may refer to a series of images from the first camera of the multi-camera device. Such series of images may include "still" images or a series of images captured as video. Similarly, image B 410 may refer to a series of images from the first camera of the multi-camera device. Such series of images may include "still" images or a series of images captured as video. Static calibration 412 may be performed using a known target scene, for example, a test target. In some examples, static calibration may be performed "at the factory" as an initial calibration step of a multi-camera device. Aspects of static calibration are further described, for example, in FIG. 5. Parameters determined from static calibration 412 may be stored in memory to be subsequently used for spatial alignment 440 and/or for photometric alignment 455.

In this example, spatial alignment 440 further spatially aligns image A and image B, mapping pixels from image A to corresponding pixels of image B. In other words, spatial alignment 440 may determine a pixel or a plurality of pixels in image A that represent the same feature as a corresponding pixel of pixels in image B. Certain aspect of spatial alignment are further described in reference to FIG. 6.

The process/system 400 also includes photometric alignment 455, which is also referred to herein as intensity alignment. Photometric alignment 455 determines transform parameters that indicate a color and/or an intensity transform of corresponding pixels of image A to image B, and vice-versa. Using the photometric alignment information, along with the spatial alignment information, corresponding pixels of image A and image B may be displayed together in a fused image without a user being able to perceive that a portion of the image was generated from the first camera and a portion of the displayed image was generated by the second camera. Certain aspects of photometric alignment are further described in reference to FIG. 7.

The process/system 400 also includes fusion 460 of a portion of image A and a portion of image B to make a displayable image 470 that can be presented to a user to show the target scene being captured by the multi-camera device, where each portion is joined with the other seamlessly such that the displayed image appears to have come from one camera. Fusion of images generated by multiple cameras is further described, for example, in reference to FIG. 8.

Figure 5:
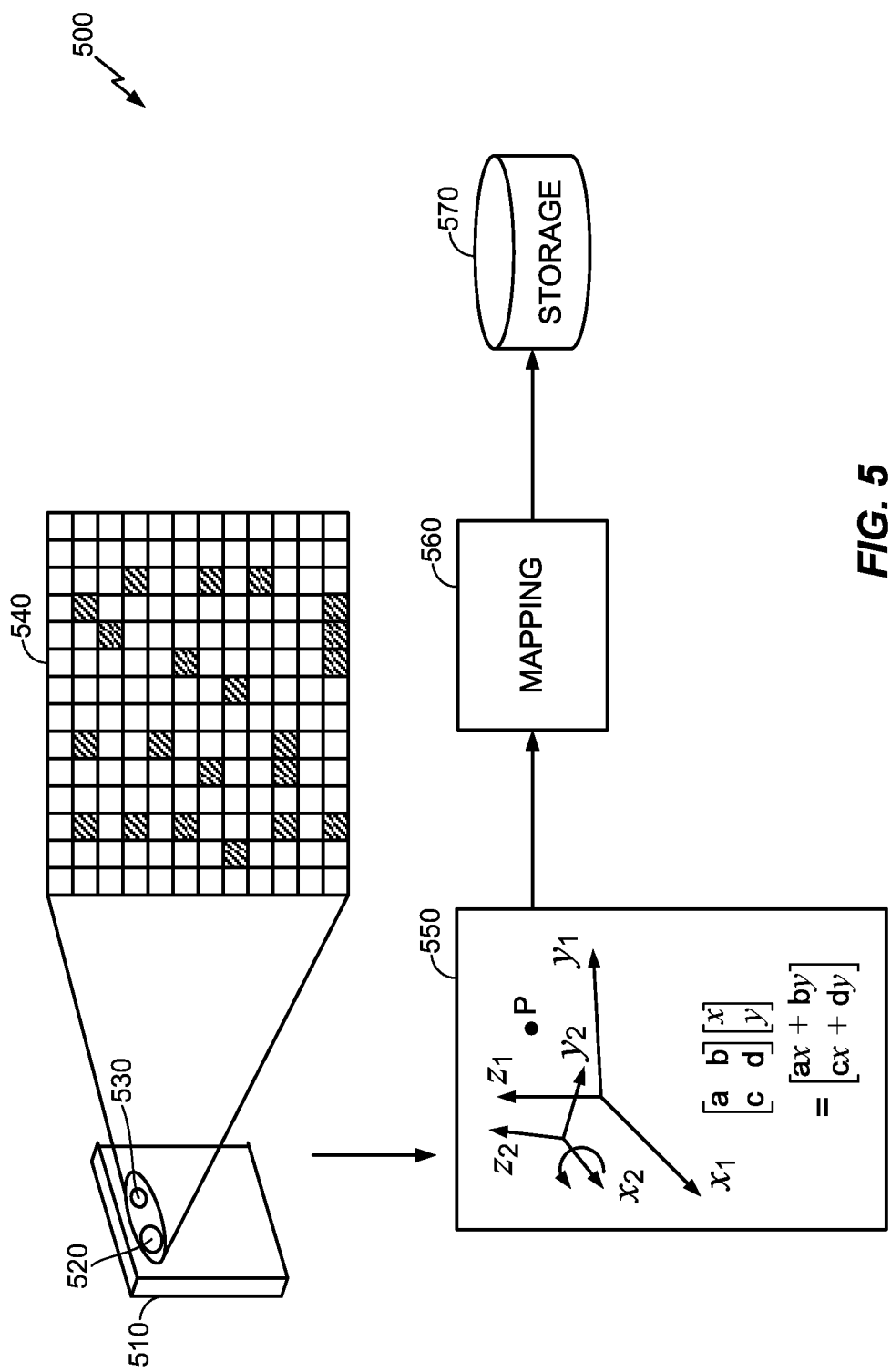
FIG. 5 illustrates an exemplary setup and stages of a static calibration procedure according to some embodiments.

In some embodiments, in order to accurately perform spatial alignment and intensity equalization, a static calibration operation can be performed on a multi-camera device. FIG. 5 demonstrates an example of an embodiment of a setup, and stages of, a static calibration procedure according to an embodiment. In some embodiments a multi-camera device 510 can two cameras 520 and 530. Camera 520 can be a wide-angle camera and camera 530 can be a telephoto camera. The static calibration operation can be performed at a factory manufacturing the multi-camera device 510 where a calibration rig 540 can be used. The calibration rig 540 can be a planar calibration plate with a checkerboard or dot pattern of known size. The cameras 520 and 530 can take images of the calibration rig 540. Using the known features and distances on the calibration rig, a transformation 550 can be estimated. The transformation 550 can include models and parameters of the two asymmetric cameras 520 and 530. These parameters can include a scaling factor. The scaling factor can be defined as roughly the ratio of the focal lengths of the two asymmetric cameras 520 and 530. The two asymmetric cameras 520 and 530 have different focal length and magnification, in order to map or juxtapose their images on each other, a scaling factor can be determined. Other parameters of the transformation 550 can include a viewpoint matching matrix, principal offset, geometric calibration and other parameters relating the images of the camera 520 to the camera 530.

Using the transformation parameters 550, a mapping 560 can be generated relating the images from the camera 520 to the images from camera 530 or vice versa. The mapping 560 and transformation parameters 550 can be stored in a memory 570 of the multi-camera device 510, or a memory component that is not part of the multi-camera device 510. As the multi-camera device 510 is subjected to wear and tear and other factors affecting its initial factor calibration, the embodiments described herein can be used to refine, readjust or tune the transformation parameters 550 and the mapping 560. For example, the spatial alignment and intensity equalization embodiments described herein can be applied dynamically as the multi-camera device 510 is being used by a user to account for shift in transformation parameters 550 and mapping 560.

Figure 6:
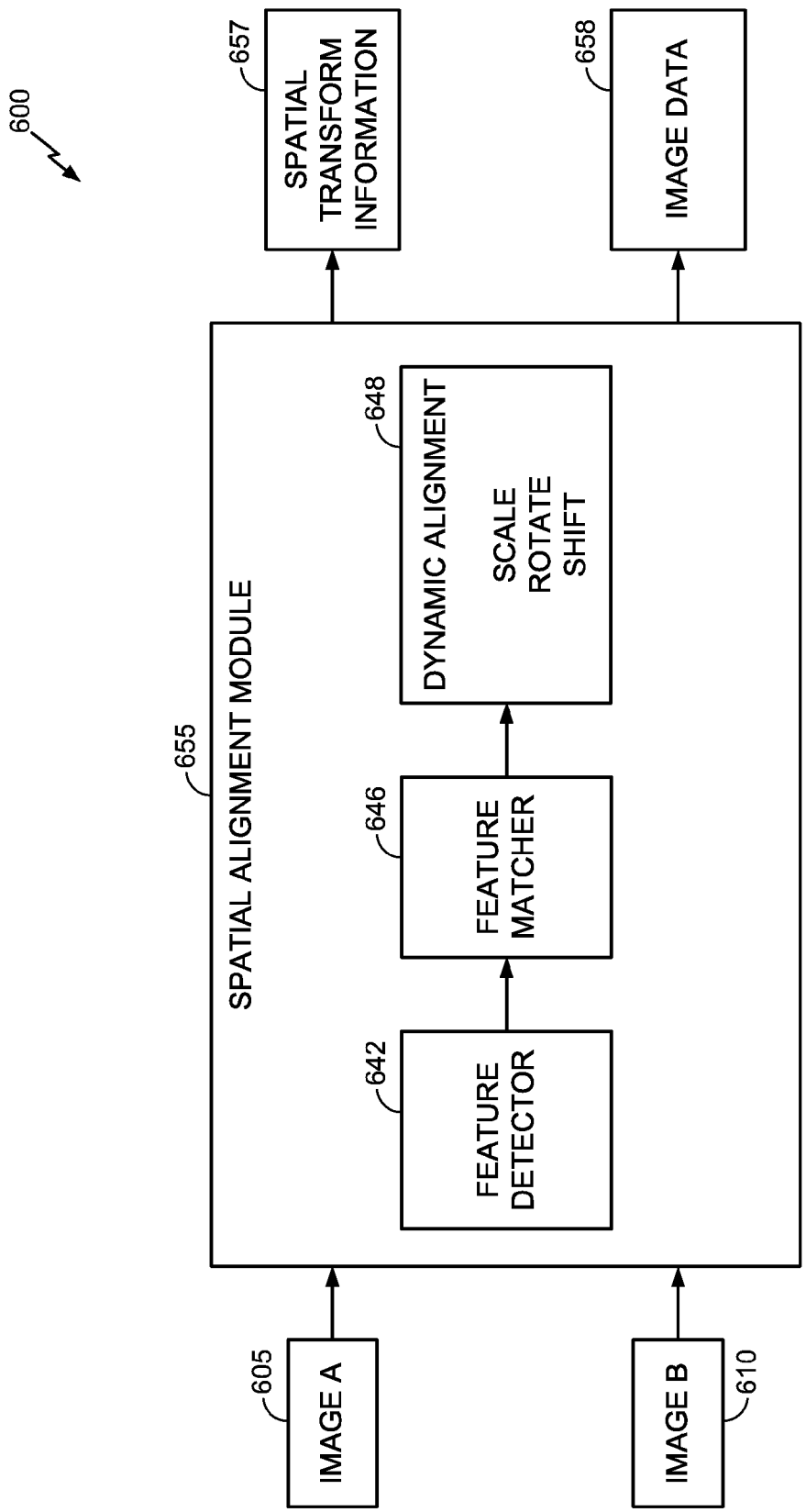
FIG. 6 is a block diagram illustrating an example of an embodiment of a spatial alignment functionality that can be used to perform spatial alignment on two images to implement a seamless zoom function.

FIG. 6 is a block diagram illustrating an example of an embodiment of a spatial alignment module 655 that can be used to perform spatial alignment of image data generated by two or more cameras that have different imaging characteristics. In one example as described in reference to FIG. 6, an image A 605 generated by a wide-angle camera can be spatially aligned with an image B generated by a telephoto camera. In other words, spatial alignment is a mapping of pixels in image A 605 to align with corresponding pixels in image B 610. The mapping may also be referred to as a transform. As a result of the mapping (or transform), the images from two cameras can be spatially aligned such that when the images are used, in whole or in part (for example, for a fused image that includes a portion of each of image A 605 and image B 610), spatially the images appear to be from the same camera (and viewpoint).

In the embodiment illustrated if FIG. 6, an image A 605 and image B 610 are provided to the spatial alignment module 655. In various embodiments, the spatial alignment module 655 may be implemented in software, hardware, or a combination of software and hardware. The spatial alignment module 655 may use previously determined alignment information (for example, retrieving such information from a memory component). The previously determined alignment information may be used as a starting point for spatial alignment of images provided by the two cameras. The spatial alignment module 655 can include a feature detector 642 and a feature matcher 646. The feature detector 642 may include instructions (or functionality) to detect features (or keypoints) in each of image A 605 and image B 610 based on criteria that may be predetermined, by one or more of various feature detection techniques known to a person of ordinary skill in the art. The feature matcher 646 match the identified features in image A 605 to image B 610 using a feature matching technique, for example, image correlation. In some embodiments, the images to be aligned may be partitioned into blocks, and feature identification and matching may be performed on a block-to-block level.

The spatial alignment module 655 also includes dynamic alignment 648, which can determine spatial transform parameters, for example, scale, rotation, shift, based on feature matching, that can be used to spatially map pixels from image A 605 to corresponding pixels in image B 610. In some embodiments the image data A 605 can be transformed to be spatially aligned with image data B 610. In other embodiments, the image data B 610 can be transformed to be spatially aligned with image data A 605. As a result of feature detection, matching and dynamic alignment, spatial transform (or mapping) information is generated that indicates operations (e.g., scale, rotation, shift) that need to be done to each pixel, or group of pixels, in image A 605 to align with a corresponding pixel (or pixels) in image B 610, or vice-versa. Such spatial transform information 657 is then stored in a memory component to be later retrieved by a processor (e.g., an image processor) to perform spatial alignment of another image or images from the wide-angle camera or the telephoto camera. In some implementations, transformed image data 658 may also be stored in a memory component for later use.

Figure 7:
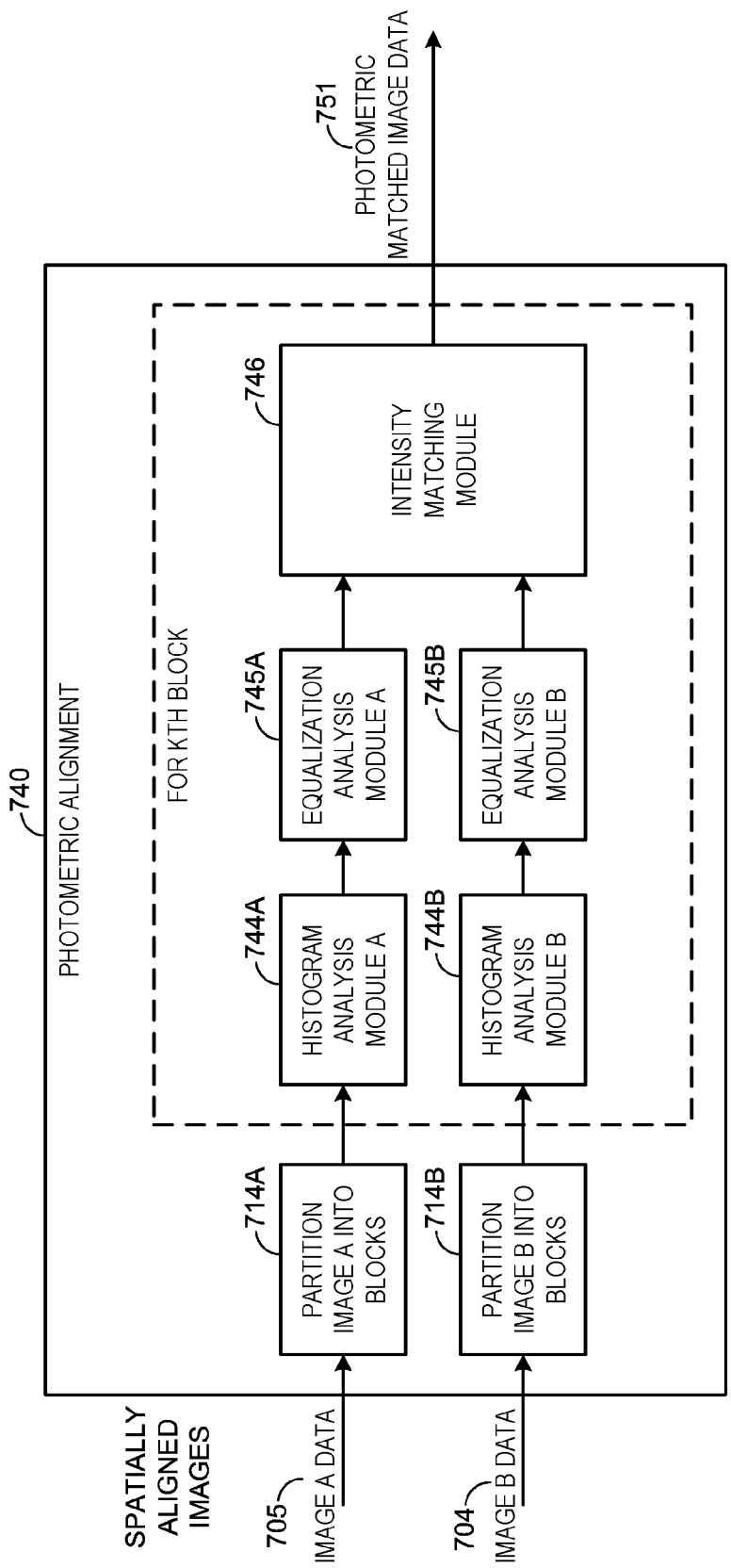
FIG. 7 is a block diagram illustrating an example of modules that can be used to execute a process for photometric alignment (or intensity equalization) to implement zoom functionality.

FIG. 7 illustrates a block diagram of an example of an embodiment of photometric alignment 740. Implementation of photometric alignment can be in software, for example, as a set of instructions in a module stored in memory, or in hardware, or both. Photometric alignment 740 may be used to match the color and intensity of pixels in a first image with the corresponding pixels in a second image. Accordingly, this may allow a portion of the first image to be displayed with a portion of the second image in a preview image such that the portions appear to have been generated from the same camera instead of two different cameras with different imaging parameters as such parameters affect intensity and color. In some embodiments, photometric alignment may be performed on two images generated with asymmetric cameras, for example, on images generated from a wide-angel camera and on images generated from a telephoto camera.

In the embodiment illustrated in FIG. 7, data representing image A 705 is received from a wide-angle camera and data representing image B 710 is received from a telephoto camera. In FIG. 7, the aligned image A data 705 and aligned image B data 704 have been spatially aligned such that pixels from one of the images spatially align with corresponding pixels of the other image. In other embodiments, information provided to photometric alignment 740 may include predetermined alignment information and/or the unaligned images generated from a first camera and a second camera. In some examples, data representing image A 705 can be spatially transformed image data A received from the spatial alignment module 655 in FIG. 6 and data representing image B 704 can be spatially transformed image data B received from the spatial alignment module 644 (FIG. 6). Image A 705 and image B 704 can have variations in intensity values, for example pixel intensity values at and around keypoint features. Although the depicted embodiment is implemented to equalize the intensity values of two images, three or more images can be sent to the intensity alignment module 740 in other embodiments. In some embodiments of intensity alignment between three or more images, one image can be identified as a reference for matching the intensity values of the other images to the intensity values of the reference image. In some embodiments, the first image sensor and the second image sensor are not asymmetric.

In this example, photometric alignment 740 includes several functional features or modules, described below. Image A data 705 can be received at partition module A 714A to be partitioned into K regions of pixel blocks. Image B data 704 can be received at partition module B 714B to be partitioned into the same number K regions of pixel blocks. The number, size, location, and shape of the pixel blocks may be based on identification of keypoints in image A and image B. In some embodiments, the images can be partitioned according to a predetermined block number and configuration.

Partitioned image data A can be received at histogram analysis module A 744A and partitioned image data B can be received at histogram analysis module B 744B. Though depicted as separate modules, in some embodiments histogram analysis module A and histogram analysis module B can be implemented as a single module. The histogram analysis modules A and B 744A, 744B can operate to determine a histogram for each of one or more colors, for example, red, green and blue, although each is not described separately herein. For each block of K blocks in each of images A and B, histogram analysis module A and histogram analysis module B can compute a probability mass function h, as shown below $$h_i(j) = \frac{n_j}{N}$$

for values of i from 1 to K and for j=0, 1 ... 255 which is the number of values for level j divided by the total number of elements per block N. Accordingly, h, is the probability mass function (PMF) of the block. This indicates the likelihood of level j occurring in the block which gives information on the spatial structure content in the region. In other example implementations, other techniques of histogram analysis may be used.

Equalization function $H_1$ can be determined by equalization module A 745A for the histogram output by histogram analysis module A 744A. For example, equalization module A 745A can sum the mass in the PMF according to following equation:

$$H_1(j) = \sum_{i=0}^{j} h_2(i)$$

to compute the cumulative mass function (CMF). Equalization analysis module B 745B can compute a similar function $H_2$ for the histogram output by histogram analysis module B 744B. Each of equalization analysis module A 745A and equalization analysis module B 745B can operate to determine operate as described herein for each of one or more colors, for example, red, green and blue, although each is not described separately herein. The CMF can indicate how the spatial intensity values change within a block, for example due to features in the block.

Intensity matching module 746 can perform a spatial mapping between the intensities of image A and image B based on the cumulative mass functions determined by the equalization modules A and B. In some embodiments, the equalization function can be applied according to:

$$\min_{j \in [0,255]} |H_1(i) - H_2(j)|$$

once the CMFs for all blocks and all sensors have been determined. This can map the intensity values in image B to the intensity values in image A such that image B is transformed to have a histogram closely resembling or matched to a histogram of image A. As a result, the regions may look very similar and can be identified by subsequent processing as corresponding regions in each image even though they were produced with asymmetric sensors. The resulting intensity matched images A and B can be representing according to:

$$\hat{j}_k = H_2^{-1}(H_1(i))$$

In other example implementations, other techniques of intensity matching may be used, sometimes being referred to as color transforms or intensity transforms. In some embodiments, in order to determine new intensity values for the pixels of image B, the matching module can perform bilinear histogram interpolation. For example, for each pixel, four new luma values can be determined by table lookup from loaded histograms. The new luma value for the target pixel may then be determined by a suitable interpolation technique, for example bilinearly, in order generate an equalized pixel value from neighboring histogram information.

Figure 8:
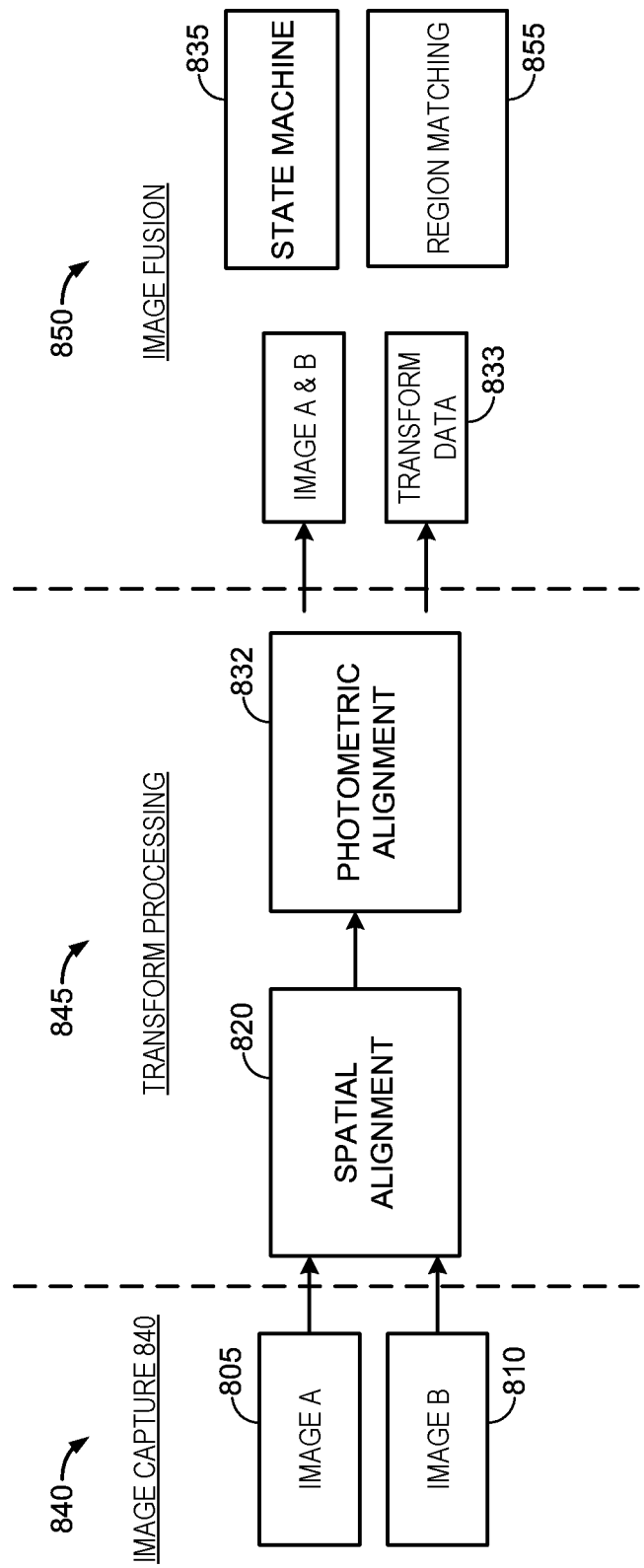
FIG. 8 is a block diagram illustrating an example of a process flow that includes spatial alignment, intensity alignment and a state machine to display images to a user for a seamless zoom functionality.

FIG. 8 is a block diagram illustrating an example of an embodiment of a process flow that illustrates stages for generating a fused image using spatial alignment and photometric alignment to implement a seamless zoom function. The process flow may include using pre-determined calibration parameters that are stored in memory to rectify or otherwise modify an image, and the calibration parameters may be applied at the preview resolution. The process may also include computing the transform, for example, at the processing (or image) resolution. A spatial transform (e.g., shift and scale) may be computed. Also, a photometric transform (e.g., histogram matching) may be computed. Depending on the state (discussed further in reference to FIGS. 9 and 10), the transform may be computed relative to the last applied transform. The transforms (spatial and photometric) may then be applied, at preview resolution, and the resulting image(s) be provided to an output display as a preview image.

During image capture 840, image A 805 and image B 810 may depict image information captured of a single target scene (for example, the same or a portion of a single target scene taken at the same time, or at a different time), or of at least some overlapping portions of an target scene (taken at the same time or at a different time). Each of image A 805 and image B 810 includes information associated with the pixels that are included in the image, for example, an intensity or brightness value (or measured signal) of the pixels as sensed by the imaging system. In some embodiments, a pixel in the image data A and/or B may also have other information relating to the pixel associated with it, for example, information relating to color or another image characteristic.

Processes and techniques for photometric alignment 832 may be used for color images (for example, with an RGB color space) to match the color spaces of the image A 805 and the image B 810 by repeating intensity equalization techniques for each color red, green and blue in the RGB color space. The same intensity equalization techniques may be used for color images in other color spaces, for example in the CMYK color space.

Image A 805 and image B 810 may be generated using asymmetric cameras disposed a distance apart with different illumination, resulting in spatial misalignment and intensity variations at in the images. In some embodiments, image A 805 and image B 810 may be formed by sensing radiation having different wavelengths (for example, infra-red radiation (IR) and visible light) used be to construct a multispectral image or for other multispectral imaging applications.

At transform processing 845, the captured image A 805 and image B 810 can be processed using spatial alignment and intensity equalization to enable accurate matching in the image data. In some embodiments region matching can be used. For example, transform processing 845 can implement a spatial alignment module 820, which can include feature detection, which can be configured (or can include instructions) to determine distinctive features for keypoints. Distinctive features can be extracted from each of image A 805 and image B 810. Such features can correspond to points in the images that can be matched with a high degree of accuracy. For example, distinctive features may be characterized at least partly by the presence of edges or lines, corners, ridges, or blobs differing in properties including but not limited to size, shape, dimension, brightness or color compared to surrounding pixel regions. As discussed above, such keypoint features can be identified by any known feature detection technique, for example, sum of squared differences, Laplacian of Gaussian (LoG), difference of Gaussian (DoG), and determinant of the Hessian (DoH), to name a few.

However, the described embodiments are not limited to image scenes for which distinctive features can be determined. For example, spatial alignment 820 can use projection based alignment when key features cannot be detected or there is insufficient information to perform spatial alignment based on key feature image data.

The transform processing stage 845 can also implement feature matching which is configured (or includes instructions) to estimate a projective transform function that maps and aligns the image A 805 and the image 810 such that the two images have equalized views.

Transform processing 845 also may include photometric alignment 832, which may partition image A 805 and image B 810 into regions comprising pixel blocks based on the identified keypoints. The region size may be determined from the optical and imaging parameters of the respective image capturing systems. The block size can be small enough to capture local variations and encompass keypoint features and large enough to sufficiently sample the local intensity probability density functions. In some embodiments, dividing an image into 4, 8, and 16 blocks can result in good performance of region matching using the equalized blocks. Some embodiments can adaptively size blocks based on keypoint features, and may achieve performance gains in region matching using the intensity-equalized and adaptively sized blocks. For example, the pixel block location, shape, and size can be determined based on the location, shape, and size of the identified keypoints. In some embodiments such as some stereoscopic alignment applications, pixel block size can be within a range of larger than a disparity value and smaller than a roll-off variation value. Photometric alignment 832 may also include determining key regions to determine a correspondence between regions of image A 805 and image B 810 in order to identify pairs of pixel blocks depicting the same feature.

The photometric alignment module 832 can generate an intensity equalization function for a pair of corresponding regions in image A and image B, for example based at least partly on histogram analysis (for example, as described above in FIG. 7). In one embodiment, to equalize local intensity, the probability mass function (PMF) of each block can be determined, the mass in the PMF can be summed to compute the cumulative mass function (CMF), and the CMF can be used to map intensity values from pixels in a first image to pixels in a second image. Accordingly, the intensity equalization between corresponding regions accounts for as the intensity structure of keypoints within the regions.

During image fusion 850, all or portions of two (or more) images may be combined or "fused" to form a preview image. Image fusion 850 may receive image A and image B, and transform data 833 to spatially and photometrically align the images relative to each other. Based on a zoom level received as an input, a preview image may be generated and displayed. In some embodiments where a wide-angle camera and a telephoto camera are used to generate image A and image B, respectively, the preview image may be generated using either all or a portion of aligned images A and B. For example, when a zoomed-out (or nearly so) input is received, a preview image formed only from image A may be displayed. When a fully zoomed-in (or nearly so) input is received, a preview image formed only from image B may be displayed. For other instances, a portion of image A may be used to form a portion of the preview image (for example, an outer portion) and a portion or all of image B may also be used to form a portion of the preview image (for example, a center portion that may be surrounded by the portion of image A). As preview images are provided based on less or greater zoom levels, the portions of images A and B that are used may vary, and one image may be diminished (or faded) when the input indicates a zoom factor in one direction, and the other image may be diminished (or faded) when the input indicates a zoom factor in the other direction. A state machine 835 may be used to control the multiple cameras and the amount of each of images A and B that are used as various zoom factors are received as input (e.g., user input). An example of a state machine is described in references to FIG. 9 and FIG. 10.

The state machine module 835, may retrieve transformation parameters generated from spatial alignment and photometric alignment module and use such parameters to fuse images to form a preview image. The state machine 835 may also be configured to store or retrieve a last transformation applied to an image (e.g., image A 805 and/or image B 810) such that an inverse transformation can be applied depending on a zoom factor input from a user. A region matching module 855 may be used in image fusion 850. For example, a spatially and photometrically aligned representation of image A and/or image B can be used to determine corresponding pixels at keypoints between image data A and image data B. Because the features can appear in different locations, orientations, and scale, the intensity-matched region data is used to determine an accurate geometric translation between corresponding keypoints. Such corresponding keypoints can be used as seams in the preview image to join images together to form the preview image.

Figure 9:
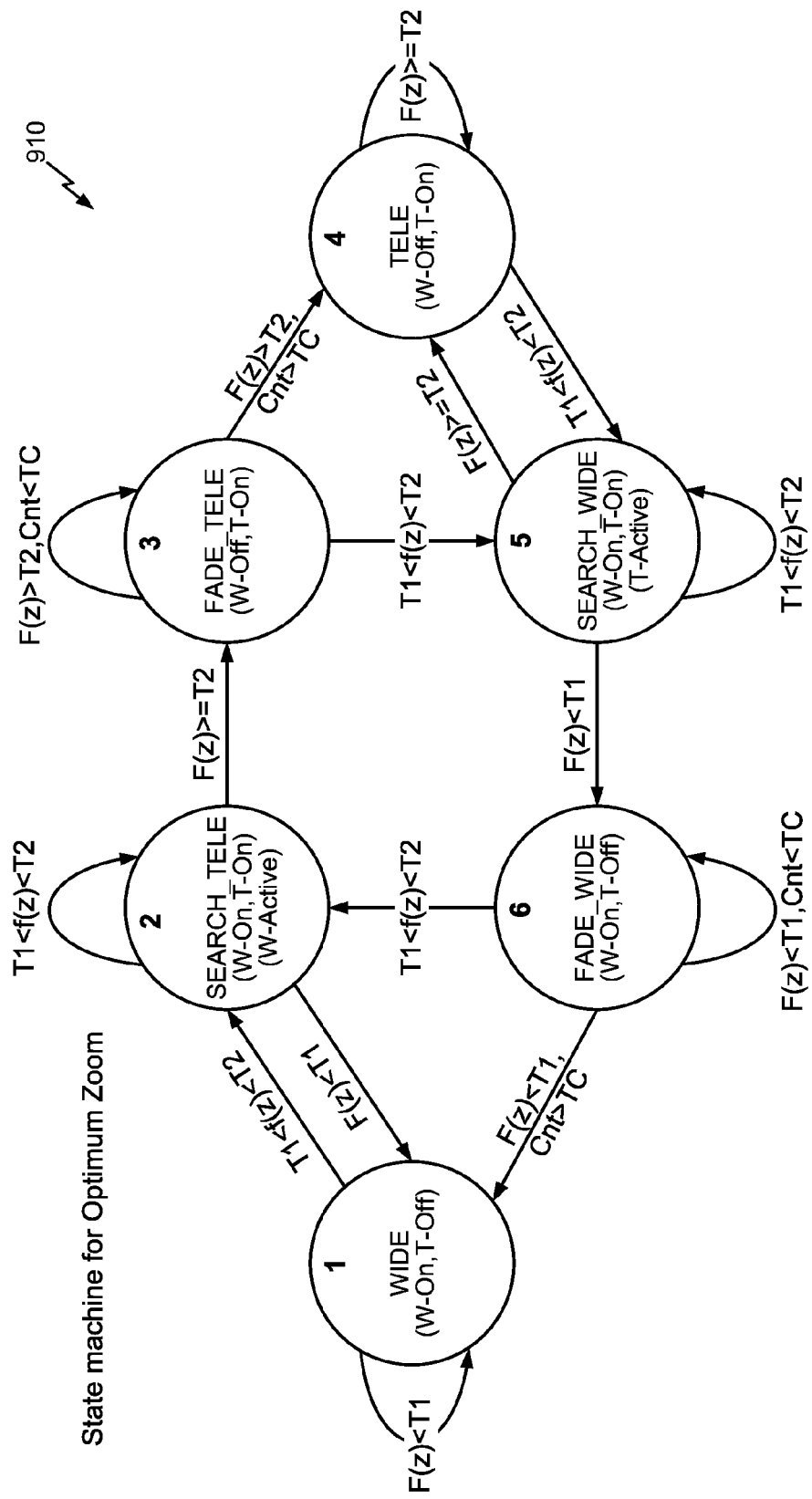
FIG. 9 is a state diagram illustrating different states of a process for seamless zoom functionality in a multi-camera device, according to some embodiments.
Figure 10:
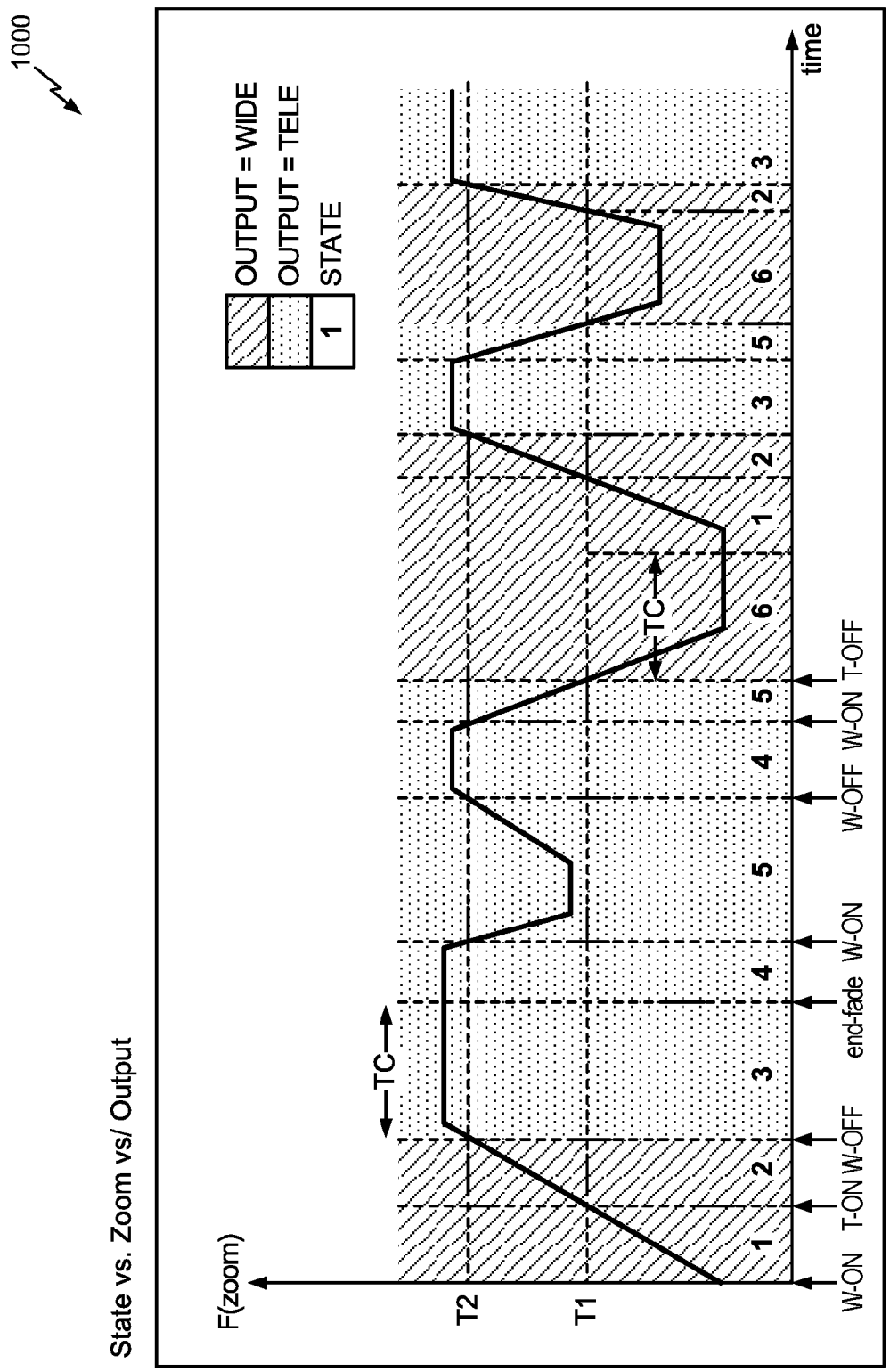
FIG. 10 is a graph illustrating an example of a zoom function (y-axis) versus time (x-axis) in a multi-camera device according to some embodiments.

FIG. 9 is a diagram illustrating an example of an embodiment of a state machine 910, which can be used to implement a seamless zoom function in a multi-camera device that includes, for example, a wide-angle camera (for example, first camera 315 of FIG. 3), a telephoto camera (for example, second camera 316 of FIG. 3) and a preview image screen (for example, display 325 of FIG. 3). FIG. 10 is a graph 1000 illustrating an example of a zoom function (y-axis) versus time (x-axis) in a multi-camera device. The graph 1000 illustrated in FIG. 10 corresponds to the state machine described with reference to FIG. 9. For example, states 1-6 are illustrated in different portions of the graph along and just above the x-axis in FIG. 10, and in the bold numbers at the top of and inside the circles illustrated in FIG. 9. F(z) is a function recited in FIG. 9 and in FIG. 10, the function F(z) being illustrated along the y-axis and representative of a zoom level. The amount of zoom (or the zoom level) increasing along the y-axis in a vertical direction relative to the graph 1000. As the zoom level F(z) increases along the y-axis, the target scene in a preview image shown on the display appears closer. In this example, the state machine 900 can be in states 1-6.

Referring to FIG. 9, in this example, a multi-camera device receives an input indicting a level of "zoom" desired by a user (for example, input by a user), or required by some functionality. The level of zoom level is represented by the function F(z). At state 1, F(z) is less than a first threshold value T1, a threshold level illustrated on the y-axis of graph 1000 (FIG. 10). In state 1, at the relatively small zoom level less than the first threshold value T1, the wide-angle camera is on and the telephoto camera is off.

If a zoom command is received that indicates a zoom level F(z) between the first threshold value T1 and a second threshold value T2 (FIG. 10), the state machine transitions to state 2. In state 2, the wide-angle camera is on and images generated by the wide-angle camera are provided to the display. In some instances, the images provide to the display are modified by a spatial and a photometric transformation before they are displayed. In state 2, the telephoto camera is also on. If a zoom command is received that indicates a zoom level F(z) greater a second threshold value T2, the state machine transitions to state 3. In state 3, the wide-angle camera may be turned off, the telephoto camera remaining on. An output of the telephoto camera can be faded into the output of the wide-angle camera to facilitate a transition from the displayed image of the wide-angle camera to the displayed image of the telephoto camera. In some embodiments, in this and other transitions from displaying images from the wide-angle camera to images from the telephoto camera, the wide-angle camera images may be transformed via a spatial transformation and a photometric transformation to match images from the telephoto camera, and when the transition is completed in state 3 and the wide-angle camera is tuned off, only images from the telephoto camera are routed to the preview image display, and such images may be displayed without transforming them spatially or photometrically. Similarly, in some examples, in transitions from displaying images from the telephoto camera to images from the wide-angle camera, the telephoto camera images may be transformed via a spatial transformation and a photometric transformation to match images from the wide-angle camera, and when the transition is completed the telephoto camera is tuned off (for example, in state 1), only images from the wide-angle camera are routed to the preview image display, and such images may be displayed without transforming them spatially or photometrically. In some examples, the state machine remains in a state (for example, state 3) if the zoom level is below the second threshold value and a time constant Cnt is less than a time constant threshold TC to help stabilize the system and prevent oscillations between providing images for display from the telephoto camera and the wide-angle camera at small changes in the zoom level near either the first threshold value T1 or the second threshold value T2. In some implementations the time constant TC is predetermined, and in some embodiments the time constant TC is dynamically determined, for example, based on the change rate of the zoom level input. In some embodiments, the time constant threshold TC can be based on the number of frames of images shown on the preview image display.

The first threshold value T1 and the second threshold values T2 may be selected based on a field of view of the wide-angle camera and/or the telephoto camera. For example, the first threshold value T1 may be selected to encompass a range of field of views within the magnification and autofocus range of the wide-angle camera. For zoom function F(z) values between the first threshold value T1 and second threshold value T2, the state machine in state 2 the telephoto camera 906 is turned on in preparation for using images from it. If the zoom command F(z) increases beyond the second threshold value T2, the state machine transitions into state 4 where the wide-angle camera may be turned off and the output of the telephoto camera can be provide to the display as a preview image. The state machine can remain in state 4 if the zoom command is greater or equal to the second threshold value T2.

If the zoom command F(z) is between the first threshold value T1 and the second threshold value T2, and the state machine is in state 3, the state machine can transition to state 5, where the wide-angle camera can be turned on in preparation for a zoom command F(z) which can indicate to display images from the wide-angle camera, such that both the wide-angle camera and the telephoto camera are on and the telephoto camera is "active" (providing at least one image as a preview image on the display. If the state machine is in state 4 and the zoom command F(z) is between the first threshold value T1 and the second threshold value T2, the state machine can transition to state 5 where the wide-angle camera may be turned on in preparation of receiving a zoom command F(z) which that signals a need for the output of the wide-angle camera to be provided to the display as a preview image. However, if the zoom command F(z) is greater or equal than the second threshold value T2, the state machine can transition to state 4 where the telephoto camera is on and the wide-angle camera is turned off.

When the state machine is in state 5 and the zoom command F(z) is less than a first threshold value T1, the state machine can transition to state 6 where the output of telephoto camera is faded out and the output of the wide-angle camera is faded in, and the telephoto camera may be turned off to save power. If the zoom command F(z) is between the first threshold value T1 and the second threshold value T2 and the state machine is in state 6, the state machine can transition to state 2 where both the wide-angle camera and the telephoto camera are turned on. If the state machine is in state 6 and the zoom command F(z) is less than the first threshold value T1 and a time constant Cnt is less than a time constant threshold TC, the state machine can remain in state 6 where the wide-angle camera is on, and the output of the telephoto camera as seen in a preview image on the display is faded out and the output of the wide-angle camera is faded in. The telephoto camera may subsequently be turned off to save power. If the state machine is in state 6 and the zoom command F(z) is less than the first threshold value T1 and the time constant Cnt is greater than the time constant threshold TC, the state machine can transition to state 1 where the wide-angle camera is on and the telephoto camera is off, and the output of the wide-angle camera can be provided to as a preview image to the display.

Figure 11:
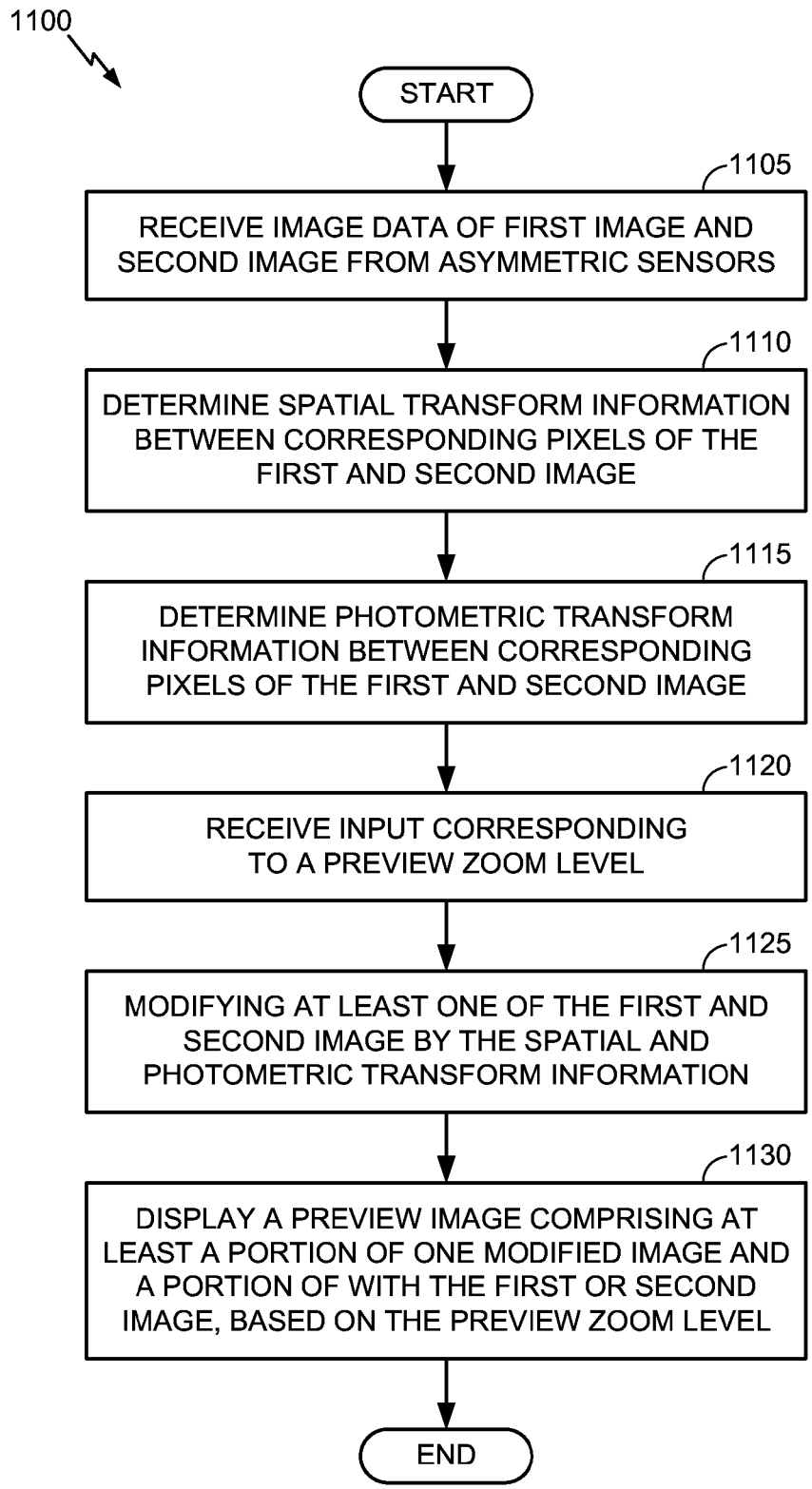
FIG. 11 illustrates a process implementing a seamless zoom function in a multi-camera device to display images that may be generated by a first and a second asymmetric camera, according to some embodiments.

FIG. 11 illustrates an example of an embodiment of a process 100 for a seamless zoom function in a multi-camera device to display images that may be generated by a first and a second asymmetric camera. At block 1105, a processor retrieves a first image from a memory component, the first image captured by a first camera having field-of-view (FOV). This may be performed, for example, by the image processor 320 and memory component 310. In some embodiments, the first camera may be a wide-angle camera.

At block 1105, the process 1100 further retrieves, using the processor, a second image from a memory component, the second image captured by a second camera having a FOV that is smaller than the FOV of the first camera, the first camera and the second camera positioned such that that a target scene in the FOV of the second camera is also in the FOV of the first camera. In some embodiments, the second camera may be a telephoto camera.

At block 1110, the process 1100 determines, using the processor, a spatial transform. The spatial transform includes information to spatially align pixels of the first image and corresponding pixels of the second image. The process 1100 then saves the spatial transform in the memory component.

At block 1115, the process 1100 determines, by a processor, a photometric transform. The photometric transform includes information of differences in color and intensity between pixels of the first image and corresponding pixels of the second image, and saving the photometric transform in the memory component.

At block 1120, the process 1100 receives input corresponding to a next preview zoom level. The input may be provided by a component on the multi-camera device configured to receive an input from a user and provide a signal representing the user input.

At block 1125, the process 1100 retrieves the spatial transform information and the photometric transform information from memory, and modifies at least one image received from a first and second cameras by the spatial transform information and the photometric transform information.

At block 1130, the process 1100 provides on the display a preview image comprising at least a portion of the at least one modified image and a portion of either the first image or the second image based on the next preview zoom level.

Implementing Systems and Terminology

Implementations disclosed herein provide systems, methods and apparatus for local intensity equalization in region matching techniques. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, one or more image signal processors, and a memory including instructions or modules for carrying out the local intensity equalization techniques discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for reducing power consumption of an imaging system having multiple cameras during operation of a zoom function, the method comprising:
   providing a first image of a scene from a first camera having a first field of view;
   providing a second image of at least a portion of the scene from a second camera having a second field of view that is smaller than the first field of view;
   presenting a preview image of the scene on a display of the imaging system, the preview image based on the first and second images;
   receiving a zoom-in command from a user;
   determining a zoom level of the zoom-in command;
   spatially aligning pixels of the first image with corresponding pixels of the second image, based on the determined zoom-in level, to generate a modified preview image;
   presenting the modified preview image on the display; and
   selectively adjusting power states of the first and second cameras based on the determined zoom-in level.

2. The method of claim 1, wherein the first camera comprises a wide-angle camera, and the second camera comprises a telephoto camera.

3. The method of claim 1, wherein the first camera has an angle of view of greater than or equal to 57 degrees, and the second camera has an angle of view of less than 50 degrees.

4. The method of claim 1, wherein selectively adjusting the power states of the first and second cameras comprises:
   maintaining the first camera in an on state and transitioning the second camera to an off state when the determined zoom-in level is less than a first value;
   maintaining the first camera and the second camera in the on state when the determined zoom-in level is greater than the first value and less than a second value, wherein the second value is greater than the first value; and
   transitioning the first camera to the off state and maintaining the second camera in the on state when the determined zoom-in level is greater than the second value.

5. The method of claim 4, wherein the first value is based on the first field of view of the first camera, and the second value is based on the second field of view of the second camera.

6. The method of claim 4, wherein:
   the modified preview image includes the first image and not the second image when the determined zoom-in level is less than the first value;
   the modified preview image includes a blend of the first image and the second image when the determined zoom-in level is greater than the first value and less than the second value; and
   the modified preview image includes the second image and not the first image when the determined zoom-in level is greater than the second value.

7. The method of claim 4, wherein presenting the preview image comprises:
   selectively fading an output of the first camera into an output of the second camera based on the zoom-in command.

8. The method of claim 4, further comprising:
   receiving a zoom-out command from the user;
   determining a zoom level of the zoom-out command; and
   selectively re-adjusting the power states of the first and second cameras based on the determined zoom-out level.

9. The method of claim 8, wherein selectively re-adjusting the power states of the first and second cameras comprises:
   transitioning the first camera from the off state to the on state when the determined zoom-out level is less than the first value and the determined zoom-in level is greater than the second value; and
   transitioning the second camera from the off state to the on state when the determined zoom-out level is greater than the first value and the determined zoom-in level is less than the first value.

10. The method of claim 9, further comprising:
    selectively fading the output of the second camera into the output of the first camera based on the zoom-out command.

11. A system for reducing power consumption of an imaging system having multiple cameras during operation of a zoom function, the system comprising:
    one or more processors; and
    a memory storing instructions that, when executed by the one or more processors, cause the system to:
        provide a first image of a scene from a first camera having a first field of view;
        provide a second image of at least a portion of the scene from a second camera having a second field of view that is smaller than the first field of view;
        present a preview image of the scene on a display of the imaging system, the preview image based on the first and second images;
        receive a zoom-in command from a user;
        determine a zoom level of the zoom-in command;
        spatially align pixels of the first image with corresponding pixels of the second image, based on the determined zoom-in level, to generate a modified preview image;

present the modified preview image on the display; and
selectively adjust power states of the first and second cameras based on the determined zoom-in level.

12. The system of claim 11, wherein the first camera comprises a wide-angle camera, and the second camera comprises a telephoto camera.

13. The system of claim 11, wherein the first camera has an angle of view of greater than or equal to 57 degrees, and the second camera has an angle of view of less than 50 degrees.

14. The system of claim 11, wherein execution of the instructions to selectively adjust the power states of the first and second cameras causes the system to:
maintain the first camera in an on state and transitioning the second camera to an off state when the determined zoom-in level is less than a first value;
maintain the first camera and the second camera in the on state when the determined zoom-in level is greater than the first value and less than a second value, wherein the second value is greater than the first value; and
transition the first camera to the off state and maintaining the second camera in the on state when the determined zoom-in level is greater than the second value.

15. The system of claim 14, wherein the first value is based on the first field of view of the first camera, and the second value is based on the second field of view of the second camera.

16. The system of claim 14, wherein:
the modified preview image includes the first image and not the second image when the determined zoom-in level is less than the first value;
the modified preview image includes a blend of the first image and the second image when the determined zoom-in level is greater than the first value and less than the second value; and
the modified preview image includes the second image and not the first image when the determined zoom-in level is greater than the second value.

17. The system of claim 14, wherein execution of the instructions to present the preview image causes the system to:
selectively fade an output of the first camera into an output of the second camera based on the zoom-in command.

18. The system of claim 14, wherein execution of the instructions further causes the system to:
receive a zoom-out command from the user;
determine a zoom level of the zoom-out command; and
selectively re-adjust the power states of the first and second cameras based on the determined zoom-out level.

19. The system of claim 18, wherein execution of the instructions to selectively re-adjust the power states of the first and second cameras causes the system to:
transition the first camera from the off state to the on state when the determined zoom-out level is less than the first value and the determined zoom-in level is greater than the second value; and
transition the second camera from the off state to the on state when the determined zoom-out level is greater than the first value and the determined zoom-in level is less than the first value.

20. The system of claim 19, wherein execution of the instructions further causes the system to:
selectively fade the output of the second camera into the output of the first camera based on the zoom-out command.

21. A non-transitory computer readable medium comprising instructions that, when executed by one or more processors of a system, cause the system to reduce power consumption of an imaging system having multiple cameras during operation of a zoom function by performing operations comprising:
providing a first image of a scene from a first camera having a first field of view;
providing a second image of at least a portion of the scene from a second camera having a second field of view that is smaller than the first field of view;
presenting a preview image of the scene on a display of the imaging system, the preview image based on the first and second images;
receiving a zoom-in command from a user;
determining a zoom level of the zoom-in command;
spatially aligning pixels of the first image with corresponding pixels of the second image, based on the determined zoom-in level, to generate a modified preview image;
presenting the modified preview image on the display; and
selectively adjusting power states of the first and second cameras based on the determined zoom-in level.

22. The non-transitory computer readable medium of claim 21, wherein the first camera comprises a wide-angle camera, and the second camera comprises a telephoto camera.

23. The non-transitory computer readable medium of claim 21, wherein the first camera has an angle of view of greater than or equal to 57 degrees, and the second camera has an angle of view of less than 50 degrees.

24. The non-transitory computer readable medium of claim 21, wherein execution of the instructions for selectively adjusting the power states of the first and second cameras causes the system to perform operations further comprising:
maintaining the first camera in an on state and transitioning the second camera to an off state when the determined zoom-in level is less than a first value;
maintaining the first camera and the second camera in the on state when the determined zoom-in level is greater than the first value and less than a second value, wherein the second value is greater than the first value; and
transitioning the first camera to the off state and maintaining the second camera in the on state when the determined zoom-in level is greater than the second value.

25. The non-transitory computer readable medium of claim 24, wherein the first value is based on the first field of view of the first camera, and the second value is based on the second field of view of the second camera.

26. The non-transitory computer readable medium of claim 24, wherein:
the modified preview image includes the first image and not the second image when the determined zoom-in level is less than the first value;
the modified preview image includes a blend of the first image and the second image when the determined zoom-in level is greater than the first value and less than the second value; and
the modified preview image includes the second image and not the first image when the determined zoom-in level is greater than the second value.

27. The non-transitory computer readable medium of claim 24, wherein execution of the instructions for presenting the preview image causes the system to perform operations further comprising:

selectively fading an output of the first camera into an output of the second camera based on the zoom-in command.

28. The non-transitory computer readable medium of claim 24, wherein execution of the instructions for presenting the preview image causes the system to perform operations further comprising:

receiving a zoom-out command from the user;

determining a zoom level of the zoom-out command; and selectively re-adjusting the power states of the first and second cameras based on the determined zoom-out level.

29. The non-transitory computer readable medium of claim 28, wherein execution of the instructions for selectively re-adjusting the power states of the first and second cameras causes the system to perform operations further comprising:

transitioning the first camera from the off state to the on state when the determined zoom-out level is less than the first value and the determined zoom-in level is greater than the second value; and transitioning the second camera from the off state to the on state when the determined zoom-out level is greater than the first value and the determined zoom-in level is less than the first value.

30. An apparatus for reducing power consumption of an imaging system having multiple cameras during operation of a zoom function, the apparatus comprising:

means for providing a first image of a scene from a first camera having a first field of view;

means for providing a second image of at least a portion of the scene from a second camera having a second field of view that is smaller than the first field of view;

means for presenting a preview image of the scene on a display of the imaging system, the preview image based on the first and second images;

means for receiving a zoom-in command from a user;

means for determining a zoom level of the zoom-in command;

means for spatially aligning pixels of the first image with corresponding pixels of the second image, based on the determined zoom-in level, to generate a modified preview image;

means for presenting the modified preview image on the display; and means for selectively adjusting power states of the first and second cameras based on the determined zoom-in level.

* * * * *